US012784181B2

(12) United States Patent
Park et al.

(10) Patent No.: US 12,784,181 B2
(45) Date of Patent: Nov. 3, 2026

(54) MASTER JIG AND EQUIPMENT DIAGNOSIS METHOD USING THE SAME

(71) Applicant: SK ON CO., LTD., Seoul (KR)

(72) Inventors: Ung Bae Park, Daejeon (KR); Do Young Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 253 days.

(21) Appl. No.: 18/636,289

(22) Filed: Apr. 16, 2024

(65) Prior Publication Data

US 2024/0354934 A1 Oct. 24, 2024

(30) Foreign Application Priority Data

Apr. 21, 2023 (KR) ........................ 10-2023-0052597
Sep. 6, 2023 (KR) ........................ 10-2023-0118339

(51) Int. Cl.
*G06T 7/00* (2017.01)
*G06T 7/13* (2017.01)
*G06T 7/60* (2017.01)

(52) U.S. Cl.
CPC ................ *G06T 7/001* (2013.01); *G06T 7/13* (2017.01); *G06T 7/60* (2013.01); *G06T 2207/30108* (2013.01); *G06T 2207/30204* (2013.01)

(58) Field of Classification Search
CPC .. G06T 7/001; G06T 7/13; G06T 7/60; G06T 2207/30108; G06T 2207/30204; G01B 21/042; G01N 21/8806; G01N 21/93
See application file for complete search history.

(56) References Cited

U.S. PATENT DOCUMENTS

| | | | | |
|---|---|---|---|---|
| 10,823,746 | B1 | 11/2020 | Busa et al. | |
| 2010/0245541 | A1 | 9/2010 | Zhao et al. | |
| 2016/0154926 | A1* | 6/2016 | Szigeti | G06T 7/80 703/8 |
| 2018/0205865 | A1* | 7/2018 | Xie | H04N 23/74 |
| 2019/0066287 | A1* | 2/2019 | Yoshida | G01B 11/254 |
| 2020/0318957 | A1 | 10/2020 | Boarino et al. | |
| 2022/0414843 | A1 | 12/2022 | Takatsu | |

(Continued)

FOREIGN PATENT DOCUMENTS

| | | | |
|---|---|---|---|
| CN | 108765494 | B | 12/2021 |
| CN | 115272330 | B | 4/2023 |
| JP | 2016046018 | A * | 4/2016 |

(Continued)

OTHER PUBLICATIONS

Extended European Search Report for European Patent Application No. 24163919.4 issued by the European Patent Office on Aug. 27, 2024.

*Primary Examiner* — Edward Park
*Assistant Examiner* — Alexander Joseph Vaughn
(74) *Attorney, Agent, or Firm* — IP&T GROUP LLP

(57) ABSTRACT

A master jig and an equipment diagnosis method using the same are disclosed. The master jig may include a case and a marking member coupled to an outer surface of the case. The equipment diagnosis method may include a step of moving the master jig inserted into a transfer device in one direction, a step in which an optical system photographs an outer surface of the master jig to acquire an image of the master jig, and a step in which a controller analyzes the image of the master jig to diagnose a state of the optical system.

18 Claims, 16 Drawing Sheets

(56) References Cited

U.S. PATENT DOCUMENTS

| | | | |
|---|---|---|---|
| 2023/0133662 | A1 | 5/2023 | Moser et al. |
| 2023/0316496 | A1* | 10/2023 | Li ........................... G06T 7/194 348/128 |

FOREIGN PATENT DOCUMENTS

| | | | |
|---|---|---|---|
| JP | 2017-015440 | A | 1/2017 |
| KR | 10-2016-0049709 | A | 5/2016 |
| KR | 10-2361748 | B1 | 2/2022 |

* cited by examiner

MASTER JIG AND EQUIPMENT DIAGNOSIS METHOD USING THE SAME

CROSS-REFERENCE TO RELATED APPLICATIONS

This patent document claims the priority and benefits of Korean Patent Application Nos. 10-2023-0052597 and 10-2023-0118339, filed on Apr. 21, 2023 and Sep. 6, 2023, which is incorporated herein by reference in its entirety.

TECHNICAL FIELD

The present disclosure relates to a master jig and an equipment diagnosis method using the same. The equipment diagnosis method according to the present disclosure can diagnose a state of the equipment by acquiring and analyzing images of the master jig.

BACKGROUND

When battery cells are manufactured, an equipment is used to inspect an external appearance of the battery cells. The equipment for inspecting the external appearance of the battery cells may include cameras, scanners, lightings, etc. The equipment for inspecting the external appearance of the battery cells may be disposed along a direction in which the battery cells are transferred.

The equipment for inspecting the external appearance of the battery cells may be out of position due to vibration, compressed air, etc. generated when the battery cells are transferred, or friction of a driver. If the equipment for inspecting the external appearance of the battery cells is out of position, it is not easy for a worker to recognize it.

PRIOR ART DOCUMENT

[Patent Document] Korean Patent Application Publication No. 10-2016-0049709

SUMMARY

The present disclosure can provide a master jig that can determine an alignment state, a misalignment state, a brightness state, etc. of an optical system.

The present disclosure can also provide a master jig and an equipment diagnosis method using the same that can determine at one time states of a plurality of optical systems arranged along a movement direction of the master jig when the master jig moves in one direction by a transfer device.

A master jig according to the present disclosure may comprise a case and a marking member coupled to an outer surface of the case. The case may include a cell body configured to extend in a left-right direction, and an extension configured to extend from left and right sides of the cell body. The marking member may include a plurality of figures consecutively arranged or a plurality of brightness areas arranged along one direction.

An equipment diagnosis method according to the present disclosure may comprise a master jig insertion step of inserting a master jig into a transfer device; a master jig movement step of moving the master jig in one direction by the transfer device; a master jig image acquisition step in which an optical system photographs an outer surface of the master jig to acquire an image of the master jig; and a master jig image analysis step in which a controller analyzes the image of the master jig to diagnose a state of the optical system.

According to an embodiment of the present disclosure, an alignment state, a misalignment state, a brightness state, etc. of an optical system can be determined.

According to an embodiment of the present disclosure, when a master jig moves in one direction by a transfer device, states of a plurality of optical systems arranged along a movement direction of the master jig can be determined at one time.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Reference will now be made in detail to embodiments of the disclosed technology, examples of which are illustrated in the accompanying drawings. However, the following description is merely an example and does not intend to limit the disclosed technology to a specific implementation.

Figure 1:
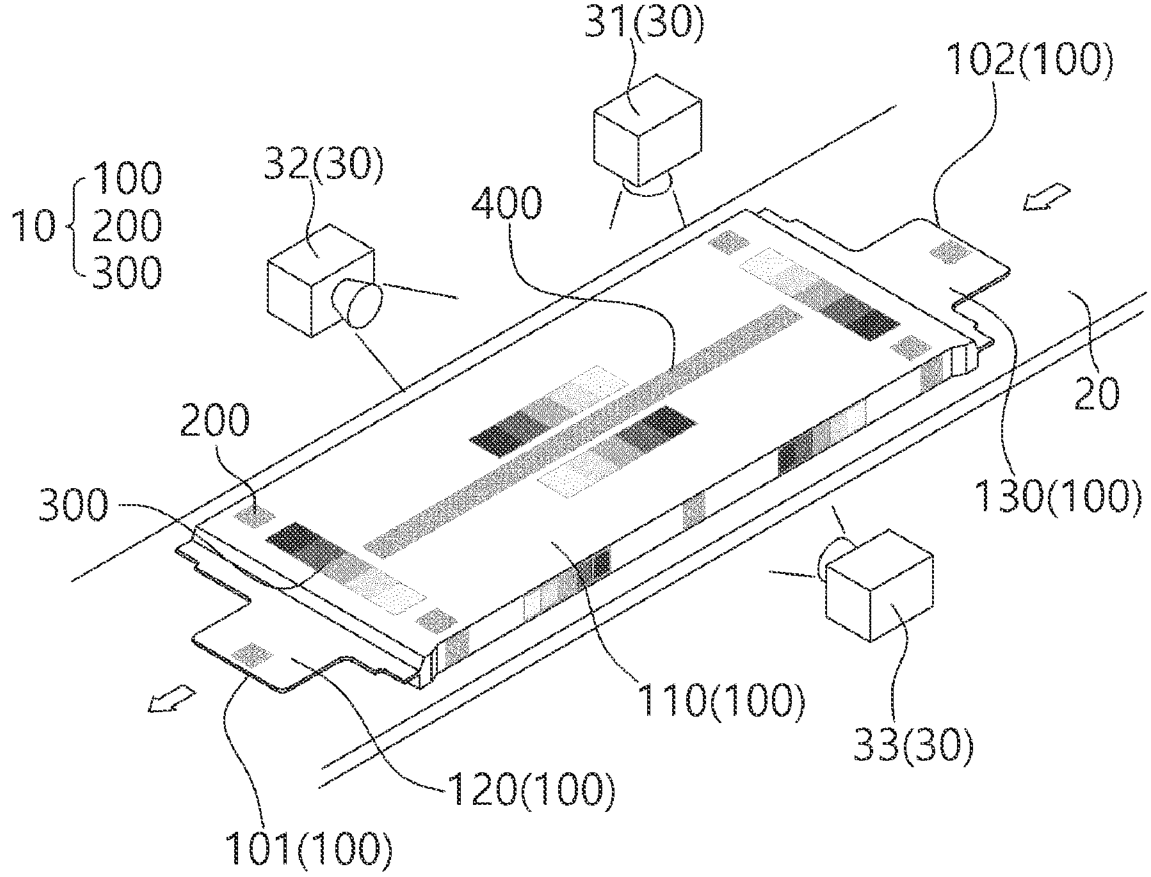
FIG. 1 illustrates a master jig 10, a transfer device 20, and an optical system 30 according to an embodiment of the present disclosure.

FIG. 1 illustrates a master jig 10, a transfer device 20, and an optical system 30 according to an embodiment of the present disclosure.

A master jig 10 may be disposed on an upper surface of a transfer device 20. The transfer device 20 may transfer the master jig 10 in one direction. For example, the one direction may be a direction from right to left.

The master jig 10 may include a case 100. The case 100 may form an outer surface of the master jig 10.

The case 100 may be formed to extend from one end 101 to other end 102. For example, the one end 101 of the case 100 may be a left end of the case 100. For example, the other end 102 of the case 100 may be a right end of the case 100.

The case 100 may include a cell body 110. The cell body 110 may be formed to extend in a left-right direction. A longitudinal direction of the cell body 110 may be the left-right direction, a width direction of the cell body 110 may be a front-rear direction, and a thickness direction of the cell body 110 may be an up-down direction. For example, the cell body 110 may correspond to a cell body of a battery cell (not shown).

The case 100 may include a first extension 120. The first extension 120 may extend from the cell body 110 to the left. A thickness of the first extension 120 may be less than a thickness of the cell body 110.

The case 100 may include a second extension 130. The second extension 130 may extend from the cell body 110 to the right. A thickness of the second extension 130 may be less than the thickness of the cell body 110.

The extensions 120 and 130 may indicate at least one of the first extension 120 or the second extension 130. For example, the extensions 120 and 130 may correspond to electrode leads of the battery cell (not shown). For example, the extensions 120 and 130 may correspond to an exterior material that surrounds and is joined to the electrode leads of the battery cell (not shown).

The master jig 10 may include a shape marking member 200. The shape marking member 200 may be referred to as a first marking member. The shape marking member 200 may be coupled to or formed on an outer surface of the case 100. For example, the master jig 10 may include a plurality of shape marking members 200. The shape marking members 200 may be coupled to or formed on at least one of an outer surface of the cell body 110, an outer surface of the first extension 120, or an outer surface of the second extension 130.

The master jig 10 may include a brightness marking member 300. The brightness marking member 300 may be referred to as a second marking member. The brightness marking member 300 may be coupled to or formed on the outer surface of the case 100. For example, the master jig 10 may include a plurality of brightness marking members 300. The brightness marking members 300 may be coupled to or formed on at least one of the outer surface of the cell body 110, the outer surface of the first extension 120, or the outer surface of the second extension 130.

The master jig 10 may include a line marking member 400. The line marking member 400 may be referred to as a third marking member. The line marking member 400 may be coupled to or formed on the outer surface of the case 100. For example, the master jig 10 may include a plurality of line marking members 400. The line marking members 400 may be coupled to or formed on at least one of the outer surface of the cell body 110, the outer surface of the first extension 120, or the outer surface of the second extension 130.

The marking members 200, 300, and 400 may indicate at least one of the shape marking member 200, the brightness marking member 300, or the line marking member 400. The marking members 200, 300, and 400 may be coupled to or formed on the outer surface of the case 100. The marking members 200, 300, and 400 may include at least one of marking, film, sticker, mask, imprint, tag, or print.

The optical system 30 may be disposed adjacent to the transfer device 20. The optical system 30 may photograph the master jig 10 transferred by the transfer device 20. The optical system 30 may be an equipment that inspects an external appearance of the battery cell (not shown) transferred by the transfer device 20. The optical system 30 may include a camera, a scanner, a lighting, etc.

A plurality of optical systems 30 may be provided. The optical systems 30 may be disposed at a plurality of positions along a direction in which the master jig 10 is transferred. The plurality of optical systems may be disposed at respective positions. The optical systems 30 may include a first optical system 31, a second optical system 32, and a third optical system 33.

The first optical system 31 may be disposed above the transfer device 20. The first optical system 31 may photograph an upper surface of the master jig 10. For example, the first optical system 31 may photograph the marking members 200, 300, and 400 coupled to the upper surface of the master jig 10.

The second optical system 32 may be disposed behind the transfer device 20. The second optical system 32 may photograph a rear surface of the master jig 10. For example, the second optical system 32 may photograph the marking members 200, 300, and 400 coupled to the rear surface of the master jig 10.

The third optical system 33 may be disposed in front of the transfer device 20. The third optical system 33 may photograph a front surface of the master jig 10. For example, the third optical system 33 may photograph the marking members 200, 300, and 400 coupled to the front surface of the master jig 10.

Figure 2:
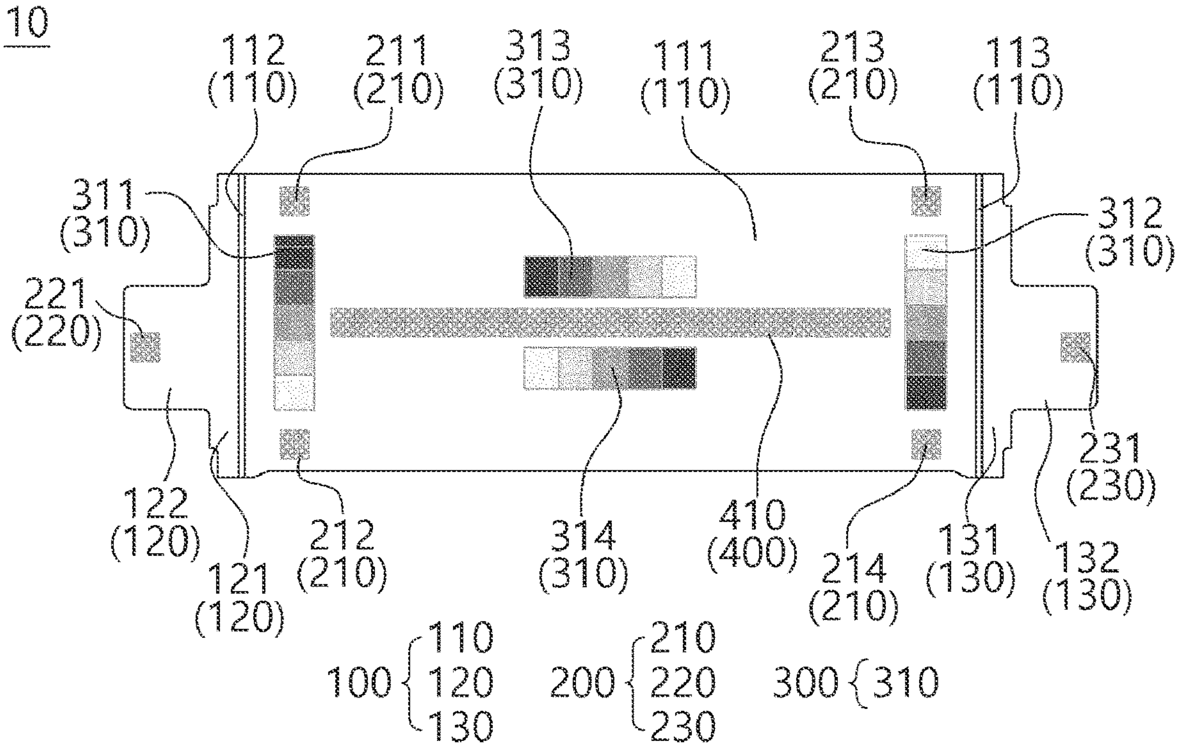
FIGS. 2 and 3 illustrate the master jig 10 of FIG. 1.
Figure 3:
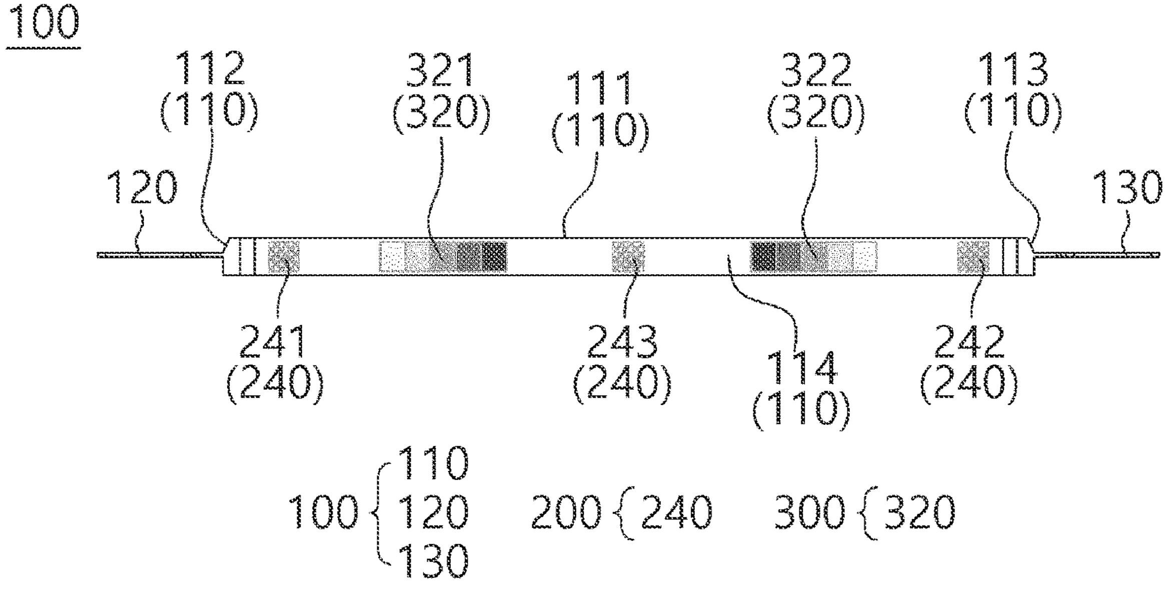

FIGS. 2 and 3 illustrate the master jig 10 of FIG. 1. More specifically, FIG. 2 illustrates the master jig 10 when viewed from above, and FIG. 3 illustrates the master jig 10 when viewed from the front.

As illustrated in FIG. 2, the cell body 110 may include a cell body upper surface 111. The cell body upper surface 111 may form a portion of an upper surface of the cell body 110. The cell body upper surface 111 may extend in the left-right direction and the front-rear direction.

The cell body 110 may include a first cell body inclined surface 112. The first cell body inclined surface 112 may form a portion of the upper surface of the cell body 110. The first cell body inclined surface 112 may extend from the cell body upper surface 111 to the left. The first cell body inclined surface 112 may form an angle with respect to the cell body upper surface 111. The first cell body inclined surface 112 may be inclined downward as it goes away from the cell body upper surface 111. The first cell body inclined surface 112 may be inclined downward as it goes from right to left.

The cell body 110 may include a second cell body inclined surface 113. The second cell body inclined surface 113 may form a portion of the upper surface of the cell body 110. The second cell body inclined surface 113 may extend from the cell body upper surface 111 to the right. The second cell body inclined surface 113 may form an angle with respect to the cell body upper surface 111. The second cell body inclined surface 113 may be inclined downward as it goes away from the cell body upper surface 111. The second cell body inclined surface 113 may be inclined downward as it goes from left to right.

The first extension 120 may include a first sealing portion upper surface 121. The first sealing portion upper surface 121 may form a portion of an upper surface of the first extension 120. The first sealing portion upper surface 121 may extend from the first cell body inclined surface 112 to the left. For example, the first sealing portion upper surface 121 may correspond to an upper surface of the exterior material that surrounds and is joined to the electrode leads of the battery cell (not shown).

The first extension 120 may include a first electrode portion upper surface 122. The first electrode portion upper surface 122 may form a portion of the upper surface of the first extension 120. The first electrode portion upper surface 122 may extend from the first sealing portion upper surface 121 to the left. A width of the first electrode portion upper surface 122 may be less than a width of the first sealing portion upper surface 121. For example, the first electrode portion upper surface 122 may correspond to an upper surface of the electrode lead of the battery cell (not shown).

The second extension 130 may include a second sealing portion upper surface 131. The second sealing portion upper surface 131 may form a portion of an upper surface of the second extension 130. The second sealing portion upper surface 131 may extend from the second cell body inclined surface 113 to the right. For example, the second sealing portion upper surface 131 may correspond to the upper surface of the exterior material that surrounds and is joined to the electrode leads of the battery cell (not shown).

The second extension 130 may include a second electrode portion upper surface 132. The second electrode portion upper surface 132 may form a portion of the upper surface of the second extension 130. The second electrode portion upper surface 132 may extend from the second sealing portion upper surface 131 to the right. A width of the second electrode portion upper surface 132 may be less than a width of the second sealing portion upper surface 131. For example, the second electrode portion upper surface 132 may correspond to then upper surface of the electrode lead of the battery cell (not shown).

The shape marking member 200 may include a first upper surface shape marking member 210. The first upper surface shape marking member 210 may be coupled to the cell body upper surface 111. The master jig 10 may include a plurality of first upper surface shape marking members 210.

The plurality of first upper surface shape marking members 210 may include a first shape marking member 211, a second shape marking member 212, a third shape marking member 213, and a fourth shape marking member 214. The first upper surface shape marking member 210 may indicate at least one of the first shape marking member 211, the second shape marking member 212, the third shape marking member 213, or the fourth shape marking member 214.

The first upper surface shape marking members 210 may be disposed along a perimeter of the cell body upper surface 111.

The first shape marking member 211 may be disposed on an upper left side of the cell body upper surface 111. The second shape marking member 212 may be disposed on a lower left side of the cell body upper surface 111. The third shape marking member 213 may be disposed on an upper right side of the cell body upper surface 111. The fourth shape marking member 214 may be disposed on a lower right side of the cell body upper surface 111.

The shape marking member 200 may include a second upper surface shape marking member 220. The second upper surface shape marking member 220 may be coupled to the upper surface of the first extension 120. For example, the second upper surface shape marking member 220 may be coupled to the first electrode portion upper surface 122.

The shape marking member 200 may include a fifth shape marking member 221. The fifth shape marking member 221 may be disposed on the left side of the first electrode portion upper surface 122.

The shape marking member 200 may include a third upper surface shape marking member 230. The third upper surface shape marking member 230 may be coupled to the upper surface of the second extension 130. For example, the third upper surface shape marking member 230 may be coupled to the second electrode portion upper surface 132.

The shape marking member 200 may include a sixth shape marking member 231. The sixth shape marking member 231 may be disposed on the left side of the second electrode portion upper surface 132.

The upper surface shape marking members 210, 220, and 230 may indicate at least one of the first upper surface shape marking members 210, the second upper surface shape marking member 220, or the third upper surface shape marking member 230.

The brightness marking member 300 may include an upper surface brightness marking member 310. The upper surface brightness marking member 310 may be coupled to the cell body upper surface 111. The master jig 10 may include a plurality of upper surface brightness marking members 310.

The plurality of upper surface brightness marking members 310 may include a first brightness marking member 311, a second brightness marking member 312, a third brightness marking member 313, and a fourth brightness marking member 314. The upper surface brightness marking member 310 may indicate at least one of the first brightness marking member 311, the second brightness marking member 312, the third brightness marking member 313, or the fourth brightness marking member 314.

The first brightness marking member 311 may be disposed on the left side of the cell body upper surface 111. The first brightness marking member 311 may be formed to extend in the front-rear direction. The first brightness marking member 311 may be disposed between the first shape marking member 211 and the second shape marking member 212.

The second brightness marking member 312 may be disposed on the right side of the cell body upper surface 111. The second brightness marking member 312 may be formed to extend in the front-rear direction. The second brightness marking member 312 may have a shape in which the first brightness marking member 311 is reversed in the front-rear direction. The second brightness marking member 312 may be disposed between the third shape marking member 213 and the fourth shape marking member 214.

The third brightness marking member 313 may be disposed at the center of the cell body upper surface 111. The third brightness marking member 313 may be formed to extend in the left-right direction. The third brightness marking member 313 may be disposed between the first brightness marking member 311 and the second brightness marking member 312.

The fourth brightness marking member 314 may be disposed at the center of the cell body upper surface 111. The fourth brightness marking member 314 may be disposed in front of the third brightness marking member 313. The fourth brightness marking member 314 may be formed to extend in the left-right direction. The fourth brightness marking member 314 may be disposed between the first brightness marking member 311 and the second brightness marking member 312.

The third brightness marking member 313 may be referred to as a rear brightness marking member. The fourth brightness marking member 314 may be referred to as a front brightness marking member. The third brightness marking member 313 and the fourth brightness marking member 314 may be disposed adjacent to each other in the front-rear direction.

The line marking member 400 may be formed to extend in one direction. For example, the line marking member 400 may be formed in a shape in which the plurality of shape marking members 200 are connected in one direction.

The line marking member 400 may include a first line marking member 410. The first line marking member 410 may be coupled to the cell body upper surface 111. The first line marking member 410 may be formed to extend in the left-right direction.

The line marking member 400 may be disposed at the center of the cell body upper surface 111. The line marking member 400 may be formed to extend in the left-right direction. A left-right direction length of the line marking member 400 may be greater than an up-down direction length of the line marking member 400. The line marking member 400 may be disposed between the first brightness marking member 311 and the second brightness marking member 312 in the left-right direction. The line marking member 400 may be disposed between the third brightness marking member 313 and the fourth brightness marking member 314 in the front-rear direction.

As illustrated in FIG. 3, the cell body 110 may include a cell body side surface 114. The cell body side surface 114 may be formed to extend downward from each of a front end and a rear end of the upper surface of the cell body 110.

For example, the cell body side surface 114 may extend downward from a front end of the cell body upper surface 111. For example, the cell body side surface 114 may extend downward from a front end of the first cell body inclined surface 112 and a front end of the second cell body inclined surface 113. For example, the cell body side surface 114 may form a front surface of the cell body 110. The cell body side surface 114 may extend in the left-right direction and the up-down direction.

The shape marking member 200 may include a side shape marking member 240. The side shape marking member 240 may be coupled to the cell body side surface 114. The master jig 10 may include a plurality of side shape marking members 240.

The plurality of side shape marking members 240 may include a seventh shape marking member 241, an eighth shape marking member 242, and a ninth shape marking member 243.

The side shape marking member 240 may indicate at least one of the seventh shape marking member 241, the eighth shape marking member 242, or the ninth shape marking member 243.

The seventh shape marking member 241 may be disposed on the left side of the cell body side surface 114. The eighth shape marking member 242 may be disposed on the right side of the cell body side surface 114. The ninth shape marking member 243 may be disposed at the center of the cell body side surface 114. The ninth shape marking member 243 may be disposed between the seventh shape marking member 241 and the eighth shape marking member 242.

The brightness marking member 300 may include a side brightness marking member 320. The side brightness marking member 320 may be coupled to the cell body side surface 114. The master jig 10 may include a plurality of side brightness marking members 320.

The plurality of side brightness marking members 320 may include a fifth brightness marking member 321 and a sixth brightness marking member 322. The side brightness marking member 320 may indicate at least one of the fifth brightness marking member 321 or the sixth brightness marking member 322.

The fifth brightness marking member 321 may be disposed on the left side of the cell body side surface 114. The fifth brightness marking member 321 may be formed to extend in the left-right direction. The fifth brightness marking member 321 may be disposed between the seventh shape marking member 241 and the ninth shape marking member 243.

The sixth brightness marking member 322 may be disposed on the right side of the cell body side surface 114. The sixth brightness marking member 322 may be formed to extend in the left-right direction. The sixth brightness marking member 322 may have a shape in which the fifth brightness marking member 321 is reversed in the left-right direction. The sixth brightness marking member 322 may be disposed between the ninth shape marking member 243 and the eighth shape marking member 242.

Figure 4:
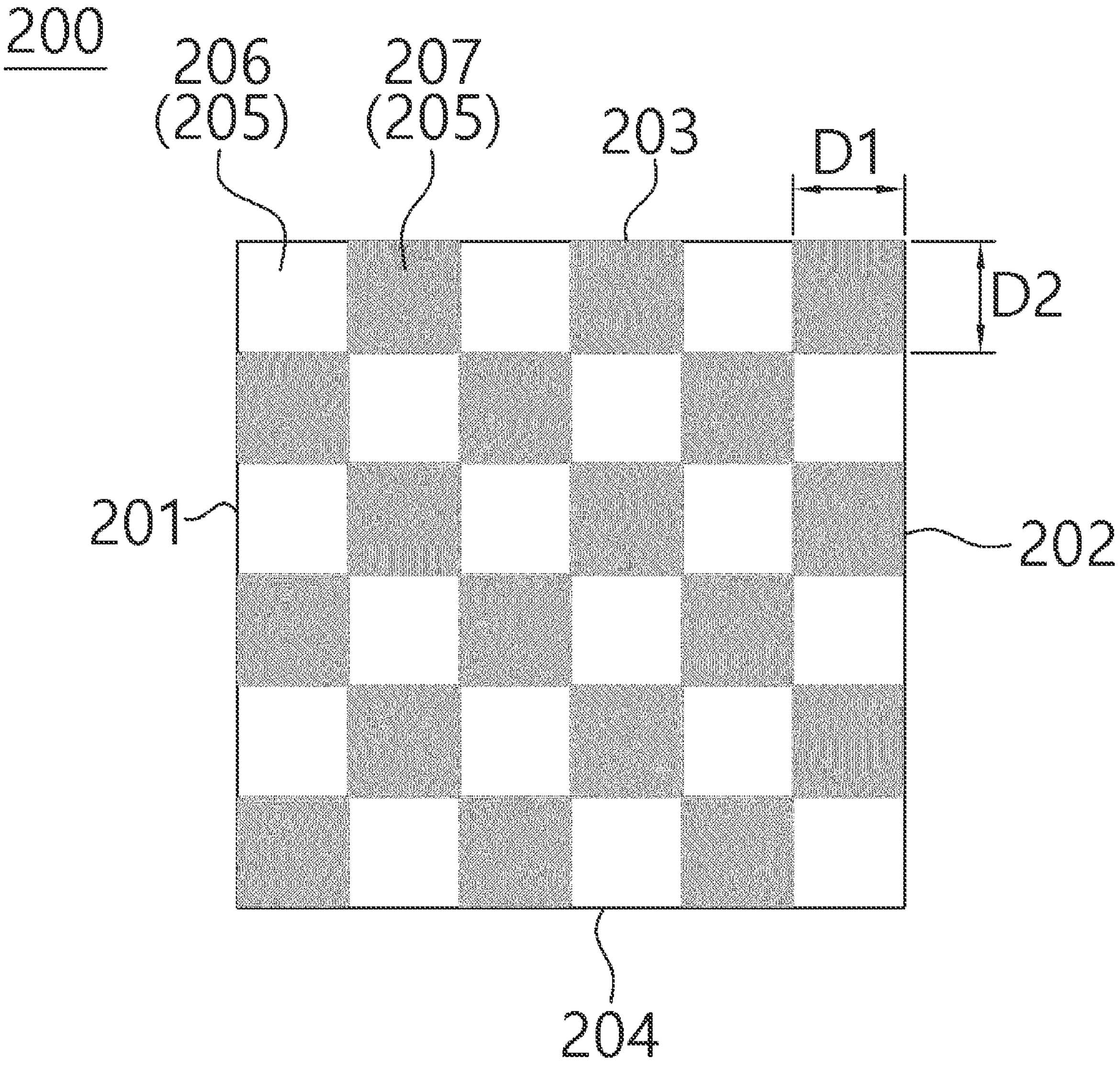
FIG. 4 illustrates a shape marking member 200 of FIGS. 2 and 3.

FIG. 4 illustrates the shape marking member 200 of FIGS. 2 and 3.

For example, the shape marking member 200 may be formed in a tetragonal shape. For example, the shape marking member 200 may be formed in a square shape.

The shape marking member 200 may include a first edge 201. The first edge 201 may extend in the front-rear direction. For example, the first edge 201 may indicate a left edge of the shape marking member 200.

The shape marking member 200 may include a second edge 202. The second edge 202 may extend in the front-rear direction. The second edge 202 may be disposed on the right side of the first edge 201. For example, the second edge 202 may indicate a right edge of the shape marking member 200.

The shape marking member 200 may include a third edge 203. The third edge 203 may extend in the left-right direction. The third edge 203 may extend from a rear end of the first edge 201 to a rear end of the second edge 202. For example, the third edge 203 may indicate a rear edge of the shape marking member 200.

The shape marking member 200 may include a fourth edge 204. The fourth edge 204 may extend in the left-right direction. The fourth edge 204 may extend from a front end of the first edge 201 to a front end of the second edge 202. For example, the fourth edge 204 may indicate a front edge of the shape marking member 200.

The edges 201, 202, 203, and 204 of the shape marking member 200 may include the first edge 201, the second edge 202, the third edge 203, and the fourth edge 204. The edges 201, 202, 203, and 204 of the shape marking member 200 may indicate any one of the first edge 201, the second edge 202, the third edge 203, and the fourth edge 204.

The shape marking member 200 may include a plurality of figures 205. The plurality of figures 205 may be consecutively arranged. The plurality of figures 205 may be arranged in contact with each other. Each figure 205 may indicate a unit figure.

The figure 205 may be formed in a preset size. For example, the figure 205 may be formed in a tetragonal shape. For example, the figure 205 may be formed in a square shape.

A horizontal length D1 of the figure 205 may indicate a left-right direction width of the figure 205. The horizontal length D1 may indicate a preset horizontal length. A vertical length D2 of the figure 205 may indicate a front-rear direction width of the figure 205. The vertical length D2 may indicate a preset vertical length. The horizontal length D1 may be the same as the vertical length D2.

The horizontal length D1 and the vertical length D2 may be preset lengths. For example, the horizontal length D1 and the vertical length D2 may be 2 mm.

The plurality of figures 205 may include a first figure type or a second figure type. A brightness of the first figure type may be higher than a brightness of the second figure type. The figure 205 corresponding to the first figure type may be referred to as a first FIG. 206. The figure 205 corresponding to the second figure type may be referred to as a second FIG. 207.

A brightness of the first FIG. 206 may be different from a brightness of the second figure 207. For example, the brightness of the first FIG. 206 may be higher than the brightness of the second figure 207. For example, the brightness of the second figure 207 may be lower than the brightness of the first FIG. 206.

The shape marking member 200 may include a plurality of first figures 206 and a plurality of second figures 207. The first figures 206 and the second figures 207 may be alternately arranged in the left-right direction and the front-rear direction. For example, the shape marking member 200 may be configured such that unit figures of the first FIG. 206 and the second figure 207 having a different brightness are arranged in a checkerboard shape.

For example, the first figures 206 and the second figures 207 may be alternately arranged along the third edge 203. This may be called a first row. A second row may be disposed in front of the first row and may touch the first row. The first figures 206 and the second figures 207 may be alternately arranged along the first row. In this instance, the first figures 206 and the second figures 207 may be configured such that the first FIG. 206 does not face other first FIG. 206, and the second figure 207 does not face other second figure 207. Third to n-th rows may be arranged based on the same rules as above.

Figure 5:
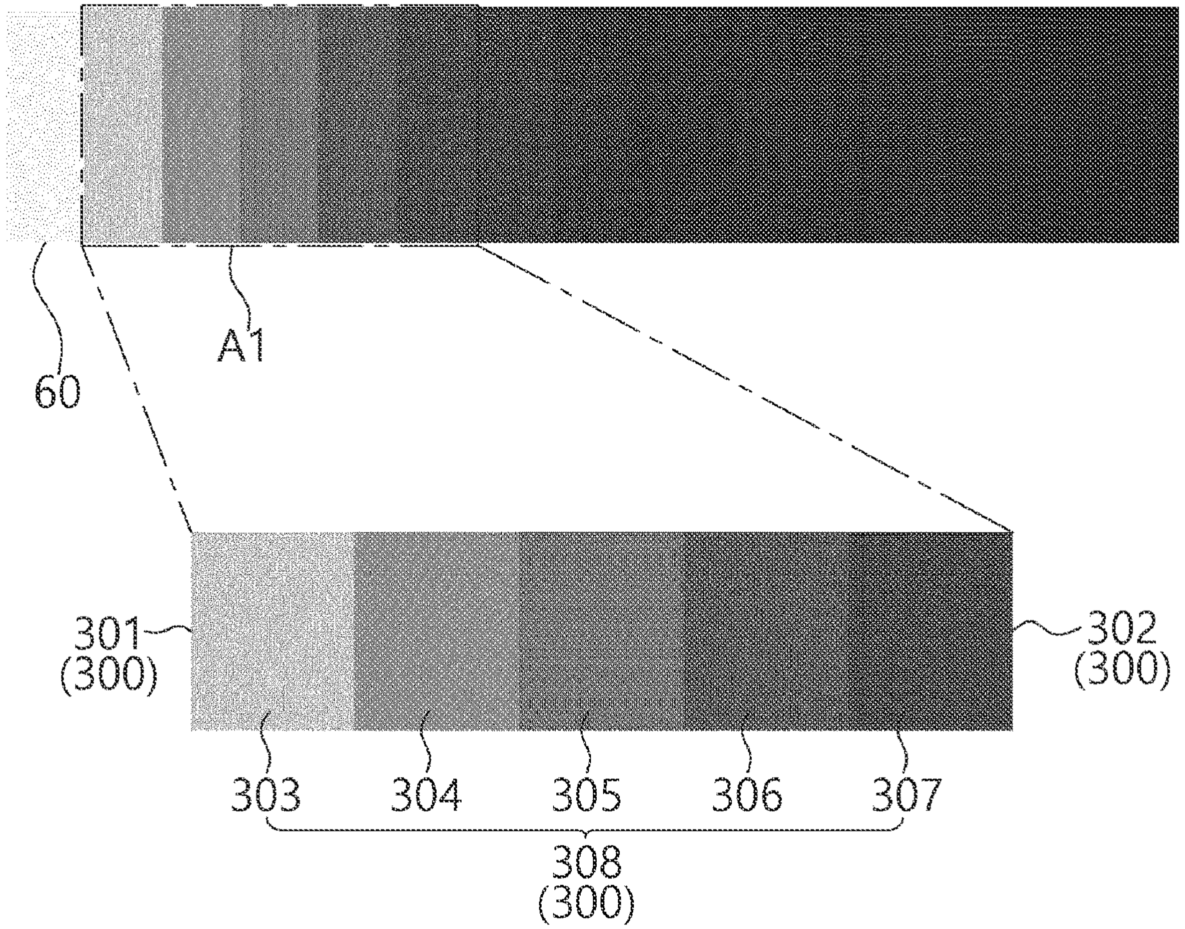
FIG. 5 illustrates a brightness marking member 300 of FIGS. 2 and 3.

FIG. 5 illustrates the brightness marking member 300 of FIGS. 2 and 3.

A brightness reference 60 may indicate a spectrum in which areas with different brightness values are sequentially arranged. The brightness reference 60 may indicate a spectrum in which the brightness value sequentially decreases as it goes in one direction. For example, the brightness reference 60 may be a grayscale film.

A brightness reference area A1 may indicate a specific area of the brightness reference 60. The brightness marking member 300 may include the same brightness value as the brightness reference area A1.

The brightness marking member 300 may be formed to extend from one end 301 to other end 302. For example, the brightness marking member 300 may be formed to extend in the left-right direction.

The brightness marking member 300 may include a plurality of brightness areas 308. The plurality of brightness areas 308 may be consecutively arranged along a longitudinal direction of the brightness marking member 300. The plurality of brightness areas 308 may be arranged so that the brightness value sequentially increases along the longitudinal direction of the brightness marking member 300.

The plurality of brightness areas 308 may include a first brightness area 303, a second brightness area 304, a third brightness area 305, a fourth brightness area 306, and a fifth brightness area 307. The first brightness area 303, the second brightness area 304, the third brightness area 305, the fourth brightness area 306, and the fifth brightness area 307 may be sequentially disposed from the one end 301 to the other end 302. For example, the first brightness area 303, the second brightness area 304, the third brightness area 305, the fourth brightness area 306, and the fifth brightness area 307 may be sequentially disposed from left to right.

The second brightness area 304 may be darker than the first brightness area 303, and the third brightness area 305 may be darker than the second brightness area 304. Further, the fourth brightness area 306 may be darker than the third brightness area 305, and the fifth brightness area 307 may be darker than the fourth brightness area 306.

The plurality of brightness areas 308 may become darker as they go from the one end 301 to the other end 302. Brightnesses of the plurality of brightness areas 308 may decrease as they go from the one end 301 to the other end 302. For example, the plurality of brightness areas 308 may become darker as they go from left to right. For example, the brightnesses of the plurality of brightness areas 308 may decrease as they go from left to right.

Figure 6:
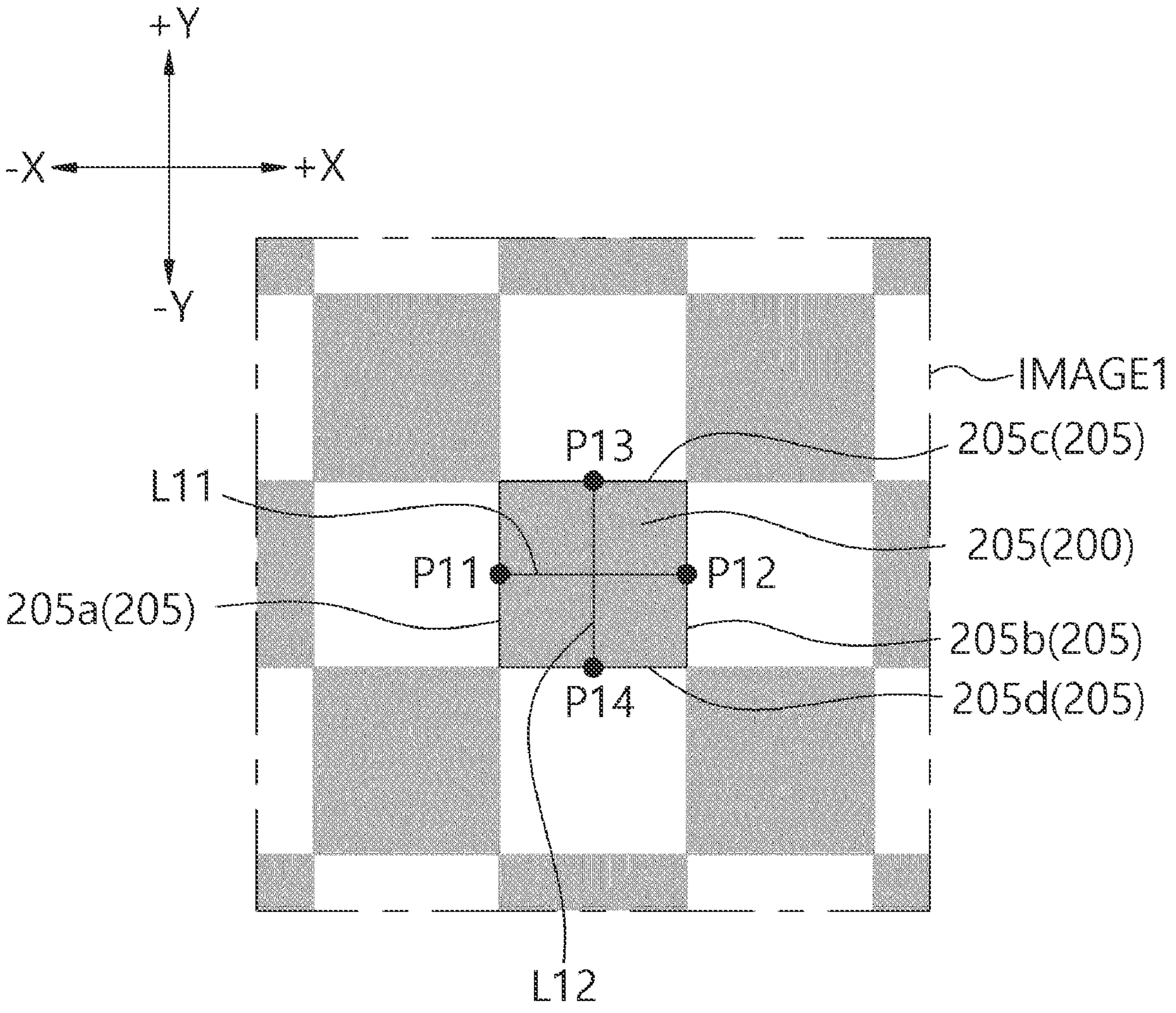
FIGS. 6 and 7 illustrate an image taken of the shape marking member 200 of FIG. 4.
Figure 7:
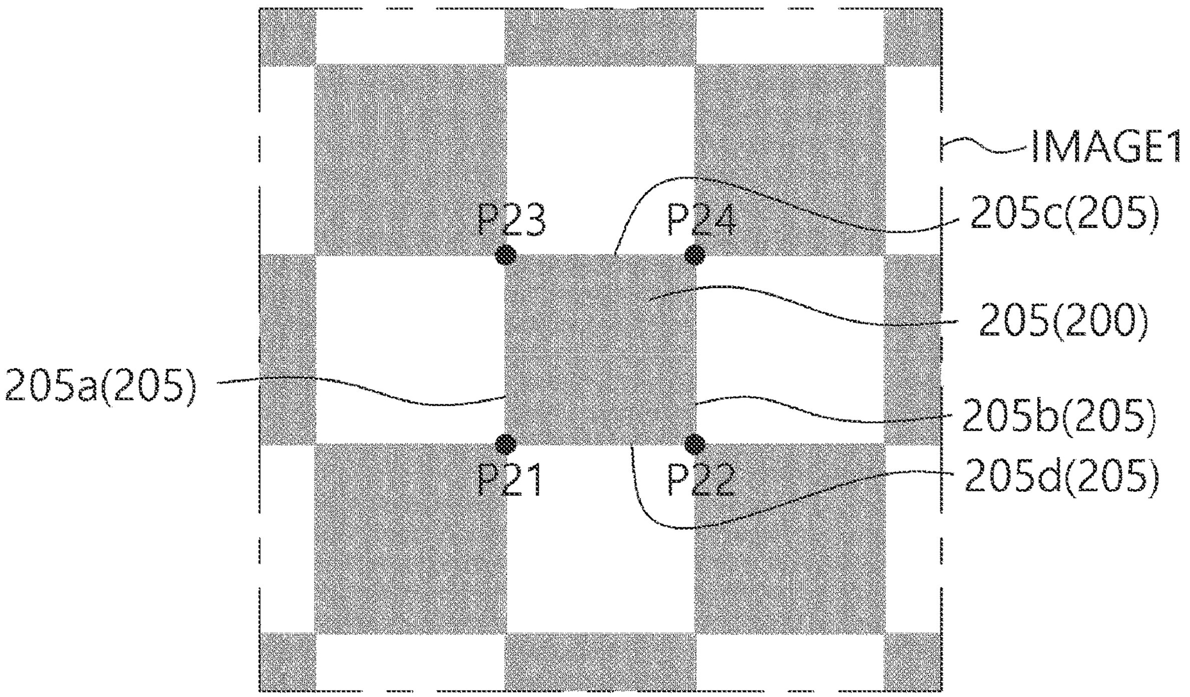

FIGS. 6 and 7 illustrate an image taken of the shape marking member 200 of FIG. 4.

As illustrated in FIG. 6, the optical system 30 (see FIG. 1) may acquire an image of the shape marking member 200. This may be referred to as a first image IMAGE1.

The first image IMAGE1 may include the plurality of figures 205. Below, a specific figure 205 of the plurality of figures 205 of the first image IMAGE1 is described by way of example.

The specific figure 205 may include a boundary line for distinguishing the specific figure 205 from the figure 205 adjacent to the specific figure 205.

The specific figure 205 may include a first boundary line 205*a*. The first boundary line 205*a* may be formed between the specific figure 205 and the figure 205 disposed in the −X direction of the specific figure 205. The first boundary line 205*a* may extend in a direction parallel to the Y-axis direction.

The specific figure 205 may include a second boundary line 205*b*. The second boundary line 205*b* may be formed between the specific figure 205 and the figure 205 disposed in the +X direction of the specific figure 205. The second boundary line 205*b* may extend in the direction parallel to the Y-axis direction.

The specific figure 205 may include a third boundary line 205*c*. The third boundary line 205*c* may be formed between the specific figure 205 and the figure 205 disposed in the +Y direction of the specific figure 205. The third boundary line 205*c* may extend in the direction parallel to the X-axis direction.

The specific figure 205 may include a fourth boundary line 205*d*. The fourth boundary line 205*d* may be formed between the specific figure 205 and the figure 205 disposed in the −Y direction of the specific figure 205. The fourth boundary line 205*d* may extend in the direction parallel to the X-axis direction.

Alternatively, referring to FIGS. 4 and 6, one figure 205 may include a boundary line touching the edges 201, 202, 203, and 204 of the shape marking member 200. The first boundary line 205*a* may touch the first edge 201, and the second boundary line 205*b* may touch the second edge 202. Further, the third boundary line 205*c* may touch the third edge 203, and the fourth boundary line 205*d* may touch the fourth edge 204.

Referring to FIG. 6, a point on the first boundary line 205*a* may be referred to as an 11th point P11. A point on the second boundary line 205*b* may be referred to as a 12th point P12. A line connecting the 11th point P11 and the 12th point P12 may be referred to as an 11th reference line L11.

For example, the 11th point P11 and the 12th point P12 may have the same Y coordinate value. For example, the 11th reference line L11 may be parallel to the third boundary line 205*c* or the fourth boundary line 205*d*.

The 11th reference line L11 may include a plurality of pixels. The number of pixels included in the 11th reference line L11 may be compared to a preset number of horizontal pixels. The preset number of horizontal pixels may be the number of pixels corresponding to the horizontal length D1 (see FIG. 4). By comparing the number of pixels included in the 11th reference line L11 with the preset number of horizontal pixels, a state of the optical system 30 (see FIG. 1) photographing the first image IMAGE1 may be analyzed.

A point on the third boundary line 205*c* may be referred to as a 13th point P13. A point on the fourth boundary line 205*d* may be referred to as a 14th point P14. A line connecting the 13th point P13 and the 14th point P14 may be referred to as a 12th reference line L12.

For example, the 13th point P13 and the 14th point P14 may have the same X coordinate value. For example, the 12th reference line L12 may be parallel to the first boundary line 205*a* or the second boundary line 205*b*.

The 12th reference line L12 may include a plurality of pixels. The number of pixels included in the 12th reference line L12 may be compared to a preset number of vertical pixels. The preset number of vertical pixels may be the number of pixels corresponding to the vertical length D2 (see FIG. 4). By comparing the number of pixels included in the 12th reference line L12 with the preset number of vertical pixels, a state of the optical system 30 (see FIG. 1) photographing the first image IMAGE1 may be analyzed.

Referring to FIG. 7, a point where the first boundary line 205*a* and the fourth boundary line 205*d* meet may be referred to as a 21st point P21. A point where the second boundary line 205*b* and the fourth boundary line 205*d* meet may be referred to as a 22nd point P22. A point where the first boundary line 205*a* and the third boundary line 205*c* meet may be referred to as a 23rd point P23. A point where the second boundary line 205*b* and the third boundary line 205*c* meet may be referred to as a 24th point P24.

For example, a 21st reference line may be a line (not shown) connecting the 21st point P21 and the 22nd point P22. For example, the fourth boundary line 205*d* may indicate the 21st reference line. The number of pixels included in the 21st reference line may be compared to the preset number of horizontal pixels.

For example, a 22nd reference line may be a line (not shown) connecting the 23rd point P23 and the 24th point P24. For example, the third boundary line 205*c* may indicate the 22nd reference line. The number of pixels included in the 22nd reference line may be compared to the preset number of horizontal pixels.

For example, a 23rd reference line may be a line (not shown) connecting the 21st point P21 and the 23rd point P23. For example, the first boundary line 205*a* may indicate the 23rd reference line. The number of pixels included in the 23rd reference line may be compared to the preset number of vertical pixels.

For example, a 24th reference line may be a line (not shown) connecting the 22nd point P22 and the 24th point P24. For example, the second boundary line 205*b* may indicate the 24th reference line. The number of pixels included in the 24th reference line may be compared to the preset number of vertical pixels.

Figure 8:
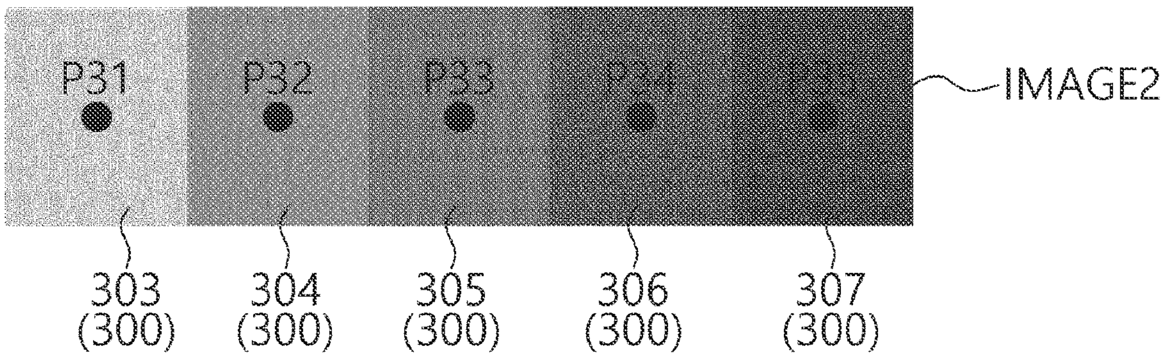
FIG. 8 illustrates an image taken of the brightness marking member 300 of FIG. 5.

FIG. 8 illustrates an image taken of the brightness marking member 300 of FIG. 5.

As illustrated in FIG. 8, the optical system 30 (see FIG. 1) may acquire an image of the brightness marking member 300. This may be referred to as a second image IMAGE2.

A point on the first brightness area 303 may be referred to as a 31st point P31. A point on the second brightness area 304 may be referred to as a 32nd point P32. A point on the third brightness area 305 may be referred to as a 33rd point P33. A point on the fourth brightness area 306 may be referred to as a 34th point P34. A point on the fifth brightness area 307 may be referred to as a 35th point P35.

A brightness value of the 31st point P31 may be compared to a preset first brightness value. The preset first brightness value may be a brightness value corresponding to the first brightness area 303. The preset first brightness value may be a brightness value of a portion corresponding to the first brightness area 303 among the brightness reference 60 (see FIG. 5). By comparing the brightness value of the 31st point P31 with the preset first brightness value, a state of the optical system 30 (see FIG. 1) photographing the second image IMAGE2 may be analyzed.

A brightness value of the 32nd point P32 may be compared to a preset second brightness value. The preset second brightness value may be a brightness value corresponding to the second brightness area 304. The preset second brightness value may be a brightness value of a portion corresponding to the second brightness area 304 among the brightness reference 60 (see FIG. 5). By comparing the brightness value of the 32nd point P32 with the preset second brightness value, the state of the optical system 30 (see FIG. 1) photographing the second image IMAGE2 may be analyzed.

A brightness value of the 33rd point P33 may be compared to a preset third brightness value. The preset third brightness value may be a brightness value corresponding to the third brightness area 305. The preset third brightness value may be a brightness value of a portion corresponding to the third brightness area 305 among the brightness reference 60 (see FIG. 5). By comparing the brightness value of the 33rd point P33 with the preset third brightness value, the state of the optical system 30 (see FIG. 1) photographing the second image IMAGE2 may be analyzed.

A brightness value of the 34th point P34 may be compared to a preset fourth brightness value. The preset fourth brightness value may be a brightness value corresponding to the fourth brightness area 306. The preset fourth brightness value may be a brightness value of a portion corresponding to the fourth brightness area 306 among the brightness reference 60 (see FIG. 5). By comparing the brightness value of the 34th point P34 with the preset fourth brightness value, the state of the optical system 30 (see FIG. 1) photographing the second image IMAGE2 may be analyzed.

A brightness value of the 35th point P35 may be compared to a preset fifth brightness value. The preset fifth brightness value may be a brightness value corresponding to the fifth brightness area 307. The preset fifth brightness value may be a brightness value of a portion corresponding to the fifth brightness area 307 among the brightness reference 60 (see FIG. 5). By comparing the brightness value of the 35th point P35 with the preset fifth brightness value, the state of the optical system 30 (see FIG. 1) photographing the second image IMAGE2 may be analyzed.

Figure 9:
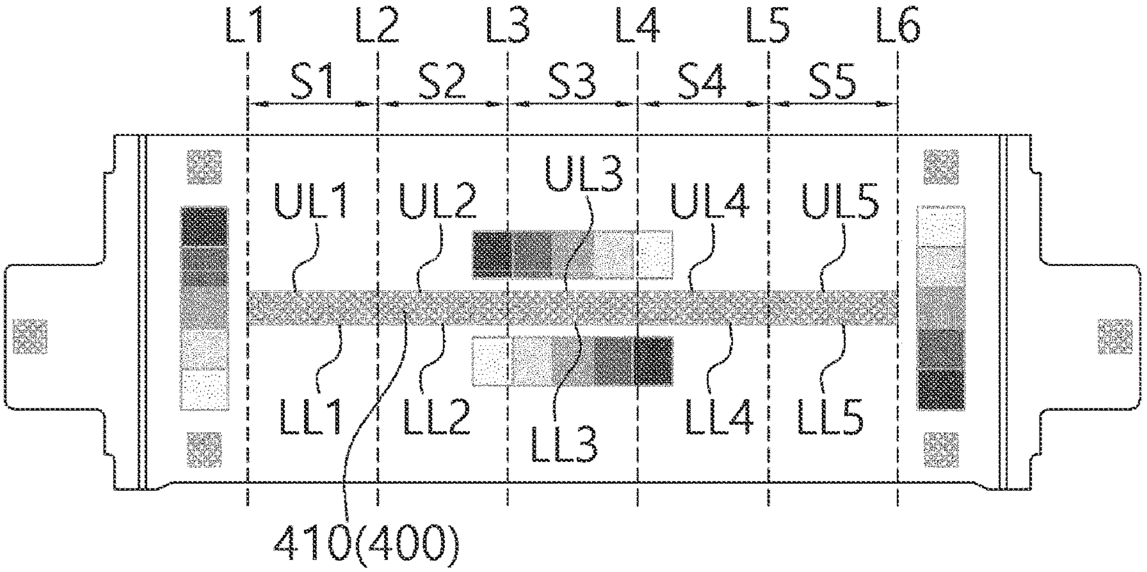
FIG. 9 illustrates an example of photographing a line marking member 400 of FIG. 2.

FIG. 9 illustrates an example of photographing the line marking member 400 of FIG. 2.

The optical system 30 (see FIG. 1) may photograph the line marking member 400 at a constant width. For example, the optical system 30 (see FIG. 1) may photograph the line marking member 400 at a constant width in the left-right direction. For example, the optical system 30 (see FIG. 1) may be a line scan camera.

The optical system 30 (see FIG. 1) may photograph the first line marking member 410 by dividing the first line marking member 410 into a plurality of zones. As illustrated in FIG. 9, the optical system 30 (see FIG. 1) may photograph the first line marking member 410 by dividing the first line marking member 410 into five zones. The plurality of zones may include a first zone S1, a second zone S2, a third zone S3, a fourth zone S4, and a fifth zone S5.

For example, the plurality of zones may be zones generated when the master jig 10 moves from the right to the left and the optical system 30, whose position is fixed, continuously photograph the master jig 10.

The first zone S1 may be a zone including a left end of the first line marking member 410. For example, the first zone S1 may be a zone having a predetermined width in the right direction from the left end of the first line marking member 410. For example, the first zone S1 may be a zone formed between a first reference line L1 and a second reference line L2. The first reference line L1 may be a line that extends in the front-rear direction and passes through the left end of the first line marking member 410. The second reference line L2 may extend in the front-rear direction and may be disposed on the right side of the first reference line L1. The second reference line L2 may be disposed to be spaced apart from the first reference line L1.

The second zone S2 may be disposed on the right side of the first zone S1. For example, the second zone S2 may be a zone formed between the second reference line L2 and a third reference line L3. The third reference line L3 may extend in the front-rear direction and may be disposed on the right side of the second reference line L2. The third reference line L3 may be disposed to be spaced apart from the second reference line L2.

The third zone S3 may be disposed on the right side of the second zone S2. For example, the third zone S3 may be a zone formed between the third reference line L3 and a fourth reference line L4. The fourth reference line L4 may extend in the front-rear direction and may be disposed on the right side of the third reference line L3. The fourth reference line L4 may be disposed to be spaced apart from the third reference line L3.

The fourth zone S4 may be disposed on the right side of the third zone S3. For example, the fourth zone S4 may be a zone formed between the fourth reference line L4 and a fifth reference line L5. The fifth reference line L5 may extend in the front-rear direction and may be disposed on the right side of the fourth reference line L4. The fifth reference line L5 may be disposed to be spaced apart from the fourth reference line L4.

The fifth zone S5 may be disposed on the right side of the fourth zone S4. For example, the fifth zone S5 may be a zone formed between the fifth reference line L5 and a sixth reference line L6. The sixth reference line L6 may extend in the front-rear direction and may be disposed on the right side of the fifth reference line L5. The sixth reference line L6 may be disposed to be spaced apart from the fifth reference line L5. The sixth reference line L6 may be a line passing through a right end of the first line marking member 410.

Respective distances between the reference lines L1, L2, L3, L4, and L5 may be constant.

FIG. 9 illustrates that the plurality of zones does not overlap each other by way of example. However, the plurality of zones may overlap each other.

The first line marking member 410 photographed in the first zone S1 may include a first upper side UL1 and a first lower side LL1. The first line marking member 410 photographed in the second zone S2 may include a second upper side UL2 and a second lower side LL2. The first line marking member 410 photographed in the third zone S3 may include a third upper side UL3 and a third lower side LL3. The first line marking member 410 photographed in the fourth zone S4 may include a fourth upper side UL4 and a fourth lower side LL4. The first line marking member 410 photographed in the fifth zone S5 may include a fifth upper side UL5 and a fifth lower side LL5.

The state of the optical system 30 (see FIG. 1) can be determined by synthesizing images photographed in the zones S1, S2, S3, S4, and S5 and analyzing whether the alignment of the upper sides UL1, UL2, UL3, UL4, and UL5 matches each other or whether the alignment of the lower sides LL1, LL2, LL3, LL4, and LL5 matches each other.

Figure 10:
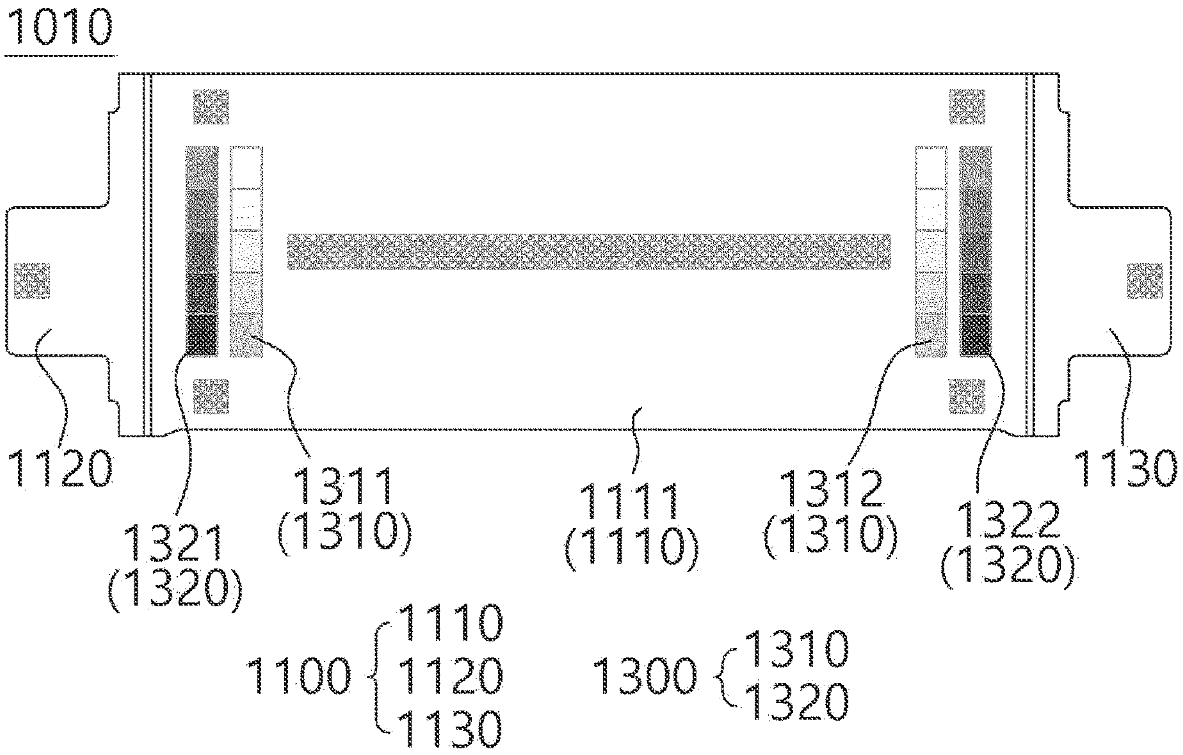
FIG. 10 illustrates a master jig 1010 according to an embodiment of the present disclosure.

FIG. 10 illustrates a master jig 1010 according to an embodiment of the present disclosure. The master jig 1010 may include a case 1100. The case 1100 may be formed the same as or similar to the case 100 illustrated in FIGS. 2 and 3.

The master jig 1010 may include a plurality of brightness marking members 1300. The brightness marking member 1300 may be formed the same as or similar to the brightness marking member 300 illustrated in FIG. 5.

The plurality of brightness marking members 1300 may include an inner brightness marking member 1310 and an outer brightness marking member 1320. The inner brightness marking member 1310 and the outer brightness marking member 1320 may be coupled to a cell body upper surface 1111. The master jig 1010 may include a plurality of inner brightness marking members 1310. The master jig 1010 may include a plurality of outer brightness marking members 1320.

The inner brightness marking member 1310 and the outer brightness marking member 1320 may be disposed adjacent to each other in the left-right direction. The outer brightness marking member 1320 may be disposed between the inner brightness marking member 1310 and a perimeter of the cell body upper surface 1111. The inner brightness marking member 1310 and the outer brightness marking member 1320 may have different brightness values.

The plurality of inner brightness marking members 1310 may include a first inner brightness marking member 1311 and a second inner brightness marking member 1312. The inner brightness marking member 1310 may indicate at least one of the first inner brightness marking member 1311 or the second inner brightness marking member 1312. Respective brightness values of the inner brightness marking member 1310 may correspond to the respective brightness values of the brightness reference area A1 of the brightness reference 60 (see FIG. 5).

The first inner brightness marking member 1311 may be disposed on the left side of the cell body upper surface 1111. The first inner brightness marking member 1311 may be formed to extend in the front-rear direction. For example, a brightness value of the first inner brightness marking member 1311 may decrease as it goes from front to back.

The second inner brightness marking member 1312 may be disposed on the right side of the cell body upper surface 1111. The second inner brightness marking member 1312 may be formed to extend in the front-rear direction. For example, a brightness value of the second inner brightness marking member 1312 may decrease as it goes from front to back.

The plurality of outer brightness marking members 1320 may include a first outer brightness marking member 1321 and a second outer brightness marking member 1322. The outer brightness marking member 1320 may indicate at least one of the first outer brightness marking member 1321 or the second outer brightness marking member 1322. Respective brightness values of the outer brightness marking member 1320 may correspond to respective brightness values of an area that does not overlap the brightness reference area A1 of the brightness reference 60 (see FIG. 5).

The first outer brightness marking member 1321 may be disposed on the left side of the cell body upper surface 1111. The first outer brightness marking member 1321 may be disposed on the left side of the first inner brightness marking member 1311. The first outer brightness marking member 1321 may be formed to extend in the front-rear direction. For example, a brightness value of the first outer brightness marking member 1321 may decrease as it goes from front to back.

The second outer brightness marking member 1322 may be disposed on the right side of the cell body upper surface 1111. The second outer brightness marking member 1322 may be disposed on the right side of the second inner brightness marking member 1312. The second outer brightness marking member 1322 may be formed to extend in the front-rear direction. For example, a brightness value of the second outer brightness marking member 1322 may decrease as it goes from front to back.

Figure 11:
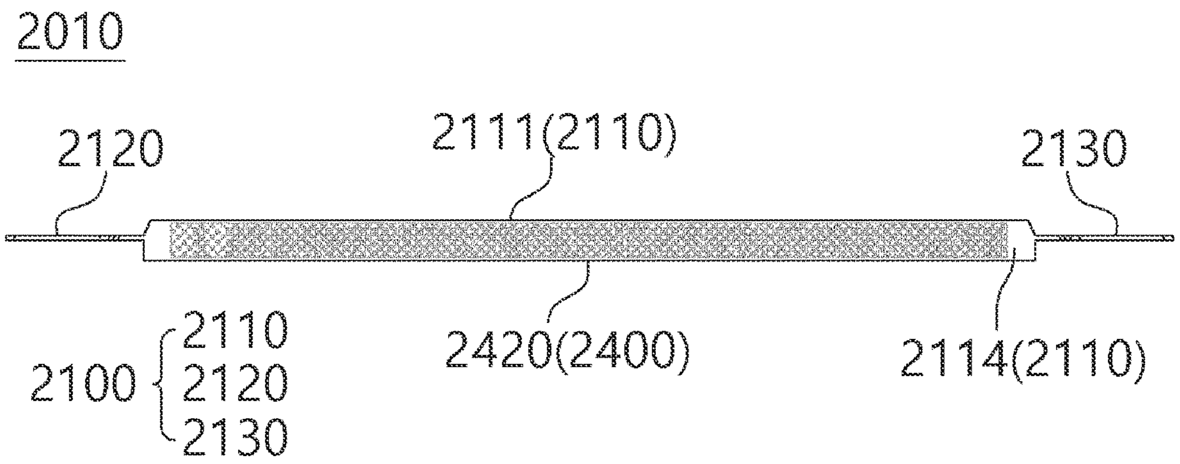
FIG. 11 illustrates a master jig 2010 according to an embodiment of the present disclosure.

FIG. 11 illustrates a master jig 2010 according to an embodiment of the present disclosure. The master jig 2010 may include a case 2100. The case 2100 may be formed the same as or similar to the case 100 illustrated in FIGS. 2 and 3.

The master jig 2010 may include a line marking member 2400. The line marking member 2400 may include a first line marking member 2420. The line marking member 2400 may be formed the same as or similar to the first line marking member 410 illustrated in FIG. 2.

The first line marking member 2420 may be coupled to a cell body side surface 2114. The first line marking member 2420 may be formed to extend in the left-right direction.

Figure 12:
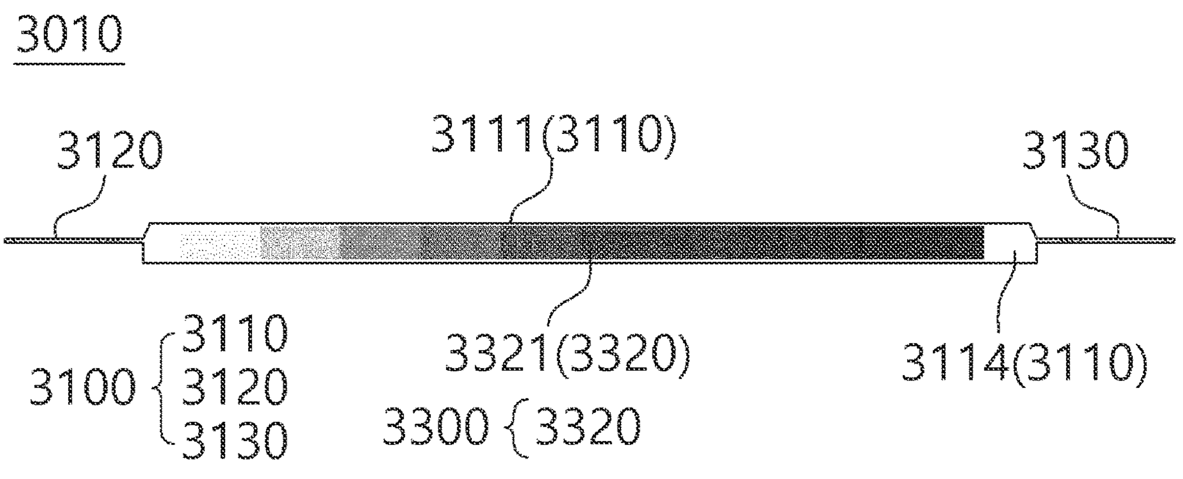
FIG. 12 illustrates a master jig 3010 according to an embodiment of the present disclosure.

FIG. 12 illustrates a master jig 3010 according to an embodiment of the present disclosure. The master jig 3010 may include a case 3100. The case 3100 may be formed the same as or similar to the case 100 illustrated in FIGS. 2 and 3.

The master jig 3010 may include a brightness marking member 3300. The brightness marking member 3300 may be formed similar to the brightness marking member 300 illustrated in FIG. 5.

The brightness marking member 3300 may be formed to extend in one direction. The brightness marking member 3300 may include a plurality of areas. The plurality of areas may be arranged along a longitudinal direction of the brightness marking member 3300.

For example, the brightness marking member 3300 may include ten areas. Brightness values of the ten areas of the brightness marking member 3300 may correspond to brightness values of ten areas in the brightness reference 60 (see FIG. 5).

The brightness marking member 3300 may include a side brightness marking member 3320. The side brightness marking member 3320 may be coupled to a cell body side surface 3114.

The side brightness marking member 3320 may include a first brightness marking member 3321. The first brightness marking member 3321 may be formed to extend in the left-right direction. A brightness value of the first brightness marking member 3321 may decrease as it goes from left to right.

Figure 13:
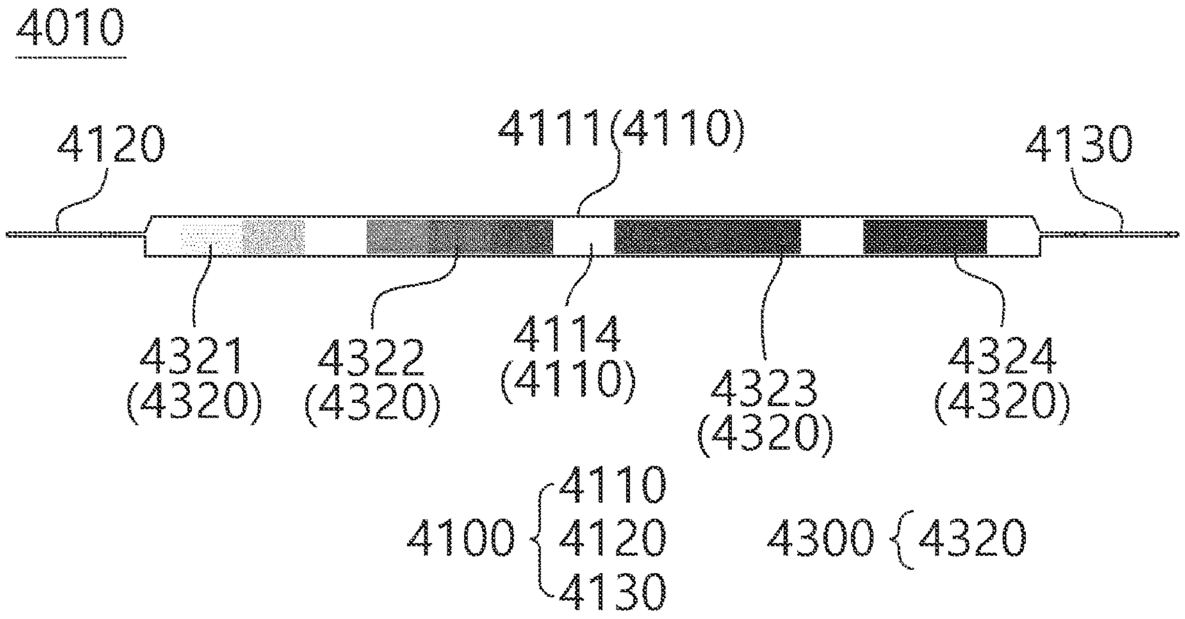
FIG. 13 illustrates a master jig 4010 according to an embodiment of the present disclosure.

FIG. 13 illustrates a master jig 4010 according to an embodiment of the present disclosure. The master jig 4010 may include a case 4100. The case 4100 may be formed the same as or similar to the case 100 illustrated in FIGS. 2 and 3.

The master jig 4010 may include a brightness marking member 4300. The brightness marking member 4300 may be formed similar to the brightness marking member 300 illustrated in FIG. 5. For example, the brightness marking member 4300 may include a plurality of groups having the plurality of brightness areas 308, and the plurality of groups may be arranged to be spaced apart from each other.

The brightness marking member 4300 may include a side brightness marking member 4320. The side brightness marking member 4320 may be coupled to a cell body side surface 4114.

The master jig 4010 may include a plurality of side brightness marking members 4320. The plurality of side brightness marking members 4320 may include a first brightness marking member 4321, a second brightness marking member 4322, a third brightness marking member 4323, and a fourth brightness marking member 4324. The side brightness marking member 4320 may indicate at least one of the first brightness marking member 4321, the second brightness marking member 4322, the third brightness marking member 4323, or the fourth brightness marking member 4324.

For example, the first brightness marking member 4321 may include two areas. Brightness values of the two areas of the first brightness marking member 4321 may correspond to brightness values of first and second areas of the ten areas in the brightness reference 60 (see FIG. 5), respectively.

For example, the second brightness marking member 4322 may include three areas. Brightness values of the three areas of the second brightness marking member 4322 may correspond to brightness values of third to fifth areas of the ten areas in the brightness reference 60 (see FIG. 5), respectively.

For example, the third brightness marking member 4323 may include three areas. Brightness values of the three areas of the third brightness marking member 4323 may correspond to brightness values of sixth to eighth areas of the ten areas in the brightness reference 60 (see FIG. 5), respectively.

For example, the fourth brightness marking member 4324 may include two areas. Brightness values of the two areas of the fourth brightness marking member 4324 may correspond to brightness values of ninth and tenth areas of the ten areas in the brightness reference 60 (see FIG. 5), respectively.

The first brightness marking member 4321 may be coupled to the left side of the cell body side surface 4114. The first brightness marking member 4321 may be formed to extend in the left-right direction. The brightness value of the first brightness marking member 4321 may decrease as it goes from left to right.

The second brightness marking member 4322 may be coupled to the cell body side surface 4114. The second brightness marking member 4322 may be disposed on the right side of the first brightness marking member 4321. The second brightness marking member 4322 may be spaced apart from the first brightness marking member 4321. The second brightness marking member 4322 may be formed to extend in the left-right direction. The brightness value of the second brightness marking member 4322 may decrease as it goes from left to right.

The third brightness marking member 4323 may be coupled to the cell body side surface 4114. The third brightness marking member 4323 may be disposed on the right side of the second brightness marking member 4322. The third brightness marking member 4323 may be spaced apart from the second brightness marking member 4322. The third brightness marking member 4323 may be formed to extend in the left-right direction. The brightness value of the third brightness marking member 4323 may decrease as it goes from left to right.

The fourth brightness marking member 4324 may be coupled to the right side of the cell body side surface 4114. The fourth brightness marking member 4324 may be disposed on the right side of the third brightness marking member 4323. The fourth brightness marking member 4324 may be spaced apart from the third brightness marking member 4323. The fourth brightness marking member 4324 may be formed to extend in the left-right direction. The brightness value of the fourth brightness marking member 4324 may decrease as it goes from left to right.

Figure 14:
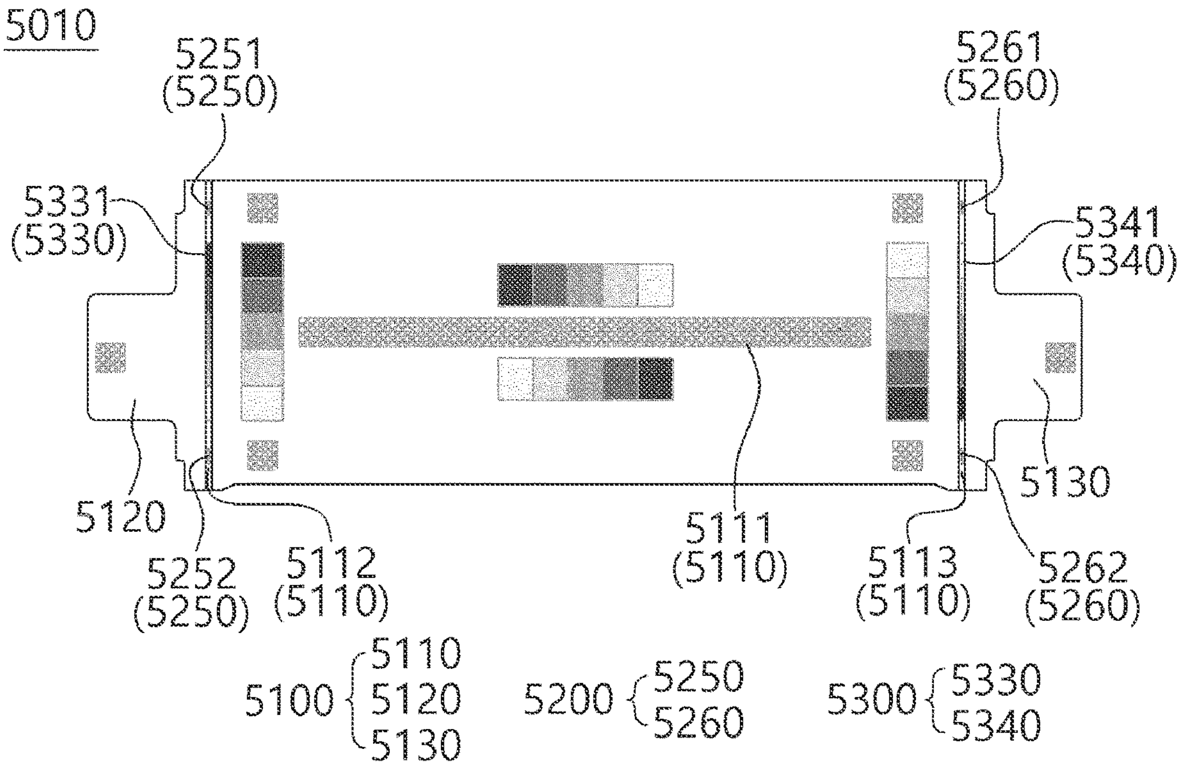
FIG. 14 illustrates a master jig 5010 according to an embodiment of the present disclosure.

FIG. 14 illustrates a master jig 5010 according to an embodiment of the present disclosure. The master jig 5010 may include a case 5100. The case 5100 may be formed the same as or similar to the case 100 illustrated in FIG. 2.

The master jig 5010 may include a shape marking member 5200. The shape marking member 5200 may be formed the same as or similar to the shape marking member 200 illustrated in FIG. 4.

The shape marking member 5200 may include a first upper surface shape marking member 5250. The first upper surface shape marking member 5250 may be coupled to a first cell body inclined surface 5112.

The master jig 5010 may include a plurality of first upper surface shape marking members 5250. The plurality of first upper surface shape marking members 5250 may include a first shape marking member 5251 and a second shape marking member 5252. The first upper surface shape marking member 5250 may indicate at least one of the first shape marking member 5251 or the second shape marking member 5252.

The first shape marking member 5251 may be disposed on the rear side of the first cell body inclined surface 5112. The second shape marking member 5252 may be disposed on the front side of the first cell body inclined surface 5112.

The shape marking member 5200 may include a second upper surface shape marking member 5260. The second upper surface shape marking member 5260 may be coupled to a second cell body inclined surface 5113.

The master jig 5010 may include a plurality of second upper surface shape marking members 5260. The plurality of second upper surface shape marking members 5260 may include a third shape marking member 5261 and a fourth shape marking member 5262. The second upper surface shape marking member 5260 may indicate at least one of the third shape marking member 5261 or the fourth shape marking member 5262.

The third shape marking member 5261 may be disposed on the rear side of the second cell body inclined surface 5113. The fourth shape marking member 5262 may be disposed on the front side of the second cell body inclined surface 5113.

The master jig 5010 may include a brightness marking member 5300. The brightness marking member 5300 may be formed the same as or similar to the brightness marking member 300 illustrated in FIG. 5.

The brightness marking member 5300 may include a first upper surface brightness marking member 5330. The first upper surface brightness marking member 5330 may be coupled to the first cell body inclined surface 5112. The first upper surface brightness marking member 5330 may extend in the front-rear direction. The first upper surface brightness marking member 5330 may be disposed between the first shape marking member 5251 and the second shape marking member 5252.

The brightness marking member 5300 may include a second upper surface brightness marking member 5340. The second upper surface brightness marking member 5340 may be coupled to the second cell body inclined surface 5113. The second upper surface brightness marking member 5340 may extend in the front-rear direction. The second upper surface brightness marking member 5340 may be disposed between the third shape marking member 5261 and the fourth shape marking member 5262.

Figure 15:
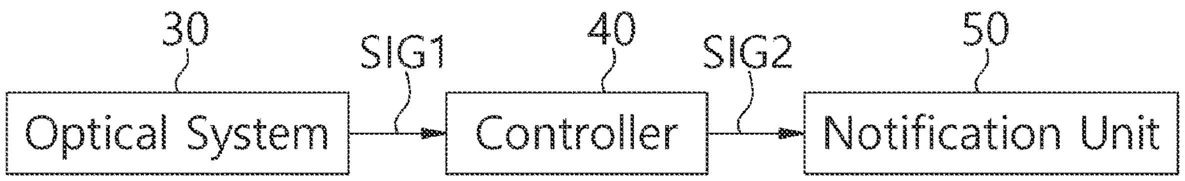
FIG. 15 illustrates an optical system 30, a controller 40, and a notification unit 50 according to an embodiment of the present disclosure.

FIG. 15 illustrates an optical system 30, a controller 40, and a notification unit 50 according to an embodiment of the present disclosure.

Referring to FIGS. 1 to 15, the optical system 30 may photograph the master jig 10. The optical system 30 may transmit a first signal SIG1 to a controller 40. The first signal SIG1 may include image information of the master jig 10. The image information of the master jig 10 may include image information of the outer surface of the master jig 10.

For example, the first optical system 31 may transmit image information of the upper surface of the master jig 10 to the controller 40. For example, the second optical system 32 may transmit an image of the rear surface of the master jig 10 to the controller 40. For example, the third optical system 33 may transmit image information of the front surface of the master jig 10 to the controller 40.

The controller 40 may analyze a state of the optical system 30 based on the image information included in the first signal SIG1. The controller 40 may extract length information, brightness information, etc. from the image of the master jig 10. The controller 40 may compare the extracted information with a preset value. The controller 40 may diagnose the state of the optical system 30.

The controller 40 may transmit a second signal SIG2 to the notification unit 50. The second signal SIG2 may include state information of the optical system 30.

The notification unit 50 may transmit the state information of the optical system 30 to a user. The user may grasp an alignment state of the optical system 30 based on the state information of the optical system 30.

Figure 16:
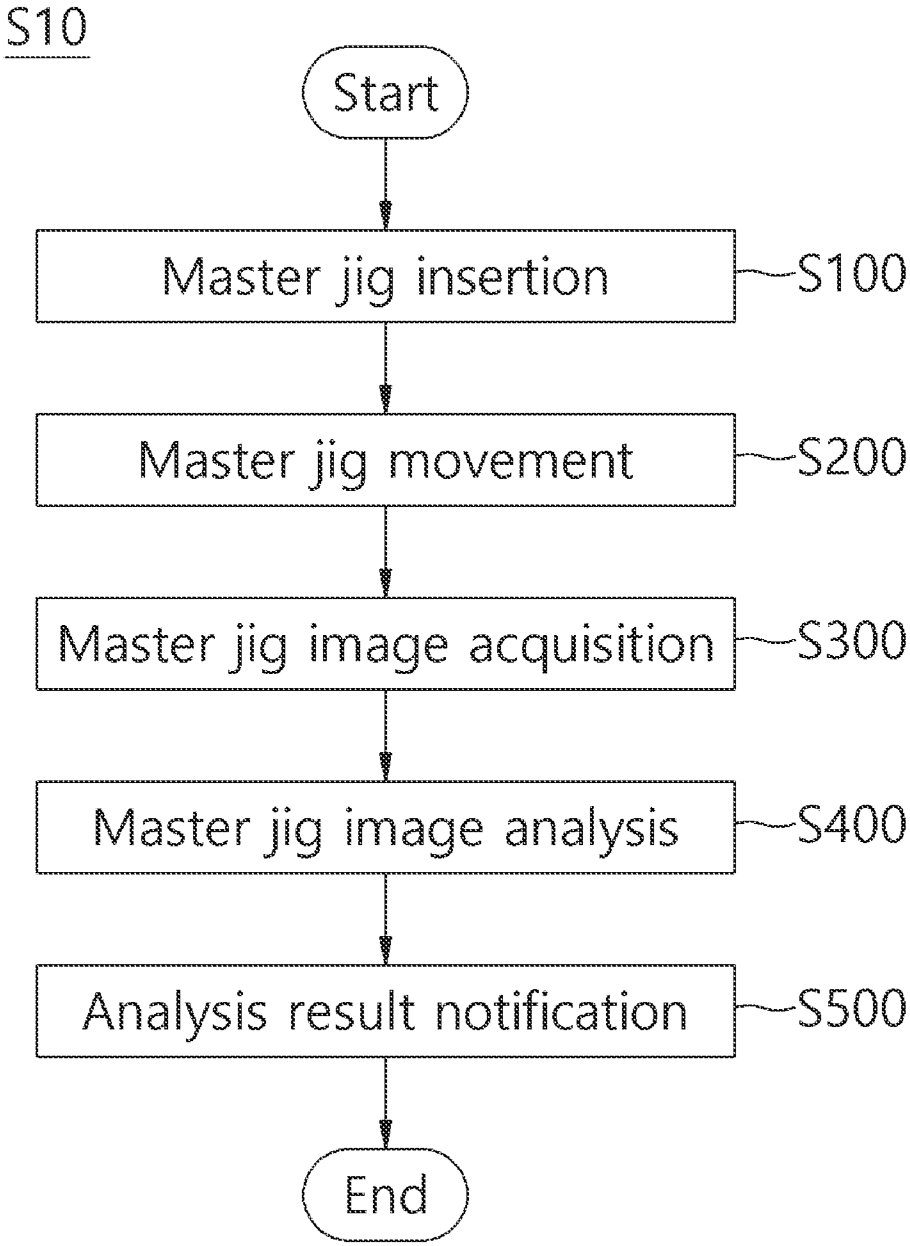
FIG. 16 is a flow chart illustrating an equipment diagnosis method S10 according to an embodiment of the present disclosure.

Below, an equipment diagnosis method S10 using the master jig 10 is described with reference to FIGS. 1 to 15. FIG. 16 is a flow chart illustrating an equipment diagnosis method S10 according to an embodiment of the present disclosure.

The equipment diagnosis method S10 may comprise a master jig insertion step S100. In the step S100, the master jig 10 may be inserted into the transfer device 20.

The equipment diagnosis method S10 may comprise a master jig movement step S200. In the step S200, the master jig 10 may move in one direction by the transfer device 20.

The equipment diagnosis method S10 may comprise a master jig image acquisition step S300. In the step S300, the optical system 30 may photograph the master jig 10. In the step S300, the optical system 30 may photograph the outer surface of the master jig 10. In the step S300, the optical system 30 may acquire an image of the master jig 10. In the step S300, the optical system 30 may transmit the image of the master jig 10 to the controller 40.

For example, in the step S300, the optical system 30 may divide the outer surface of the master jig 10 into a plurality of zones and photograph the zones. For example, in the step S300, the optical system 30 may divide the line marking member 400 into a plurality of zones and photograph the zones. The optical system 30 may acquire an image for each zone. A plurality of zones may be sequentially arranged along a movement direction of the master jig 10.

The equipment diagnosis method S10 may comprise a master jig image analysis step S400. In the step S400, the controller 40 may analyze the image of the master jig 10 received from the optical system 30. In the step S400, the controller 40 may extract data from the image of the master jig 10. In the step S400, the controller 40 may compare the data extracted from the image of the master jig 10 with a preset value. In the step S400, the controller 40 may diagnose a state of the optical system 30. In the step S400, the controller 40 may transmit the state of the optical system 30 to the notification unit 50. For example, in the step S400, the controller 40 may transmit, to the notification unit 50, whether the state of the optical system 30 is normal or abnormal.

The equipment diagnosis method S10 may comprise an analysis result notification step S500. In the step S500, the notification unit 50 may notify the user of the state of the optical system 30. For example, in the step S500, the notification unit 50 may notify the user whether the state of the optical system 30 is normal or abnormal.

For example, the notification unit 50 may notify the user of an alignment state of the optical system 30. For example, the notification unit 50 may notify the user of a misalignment state of the optical system 30. For example, the notification unit 50 may notify the user of a brightness status of the optical system 30.

Figure 17:
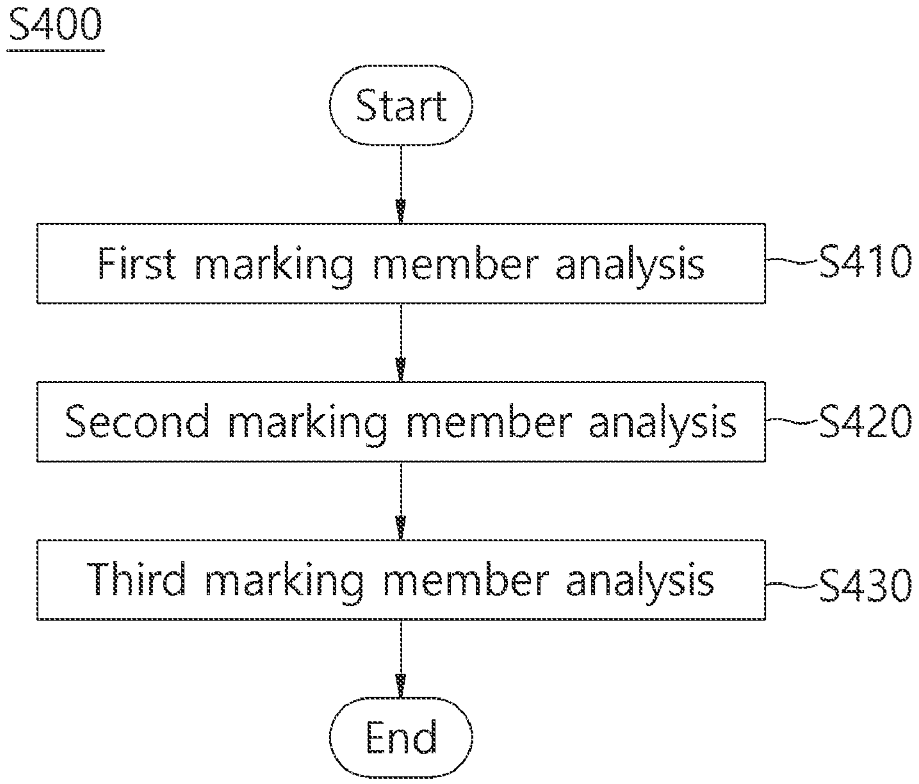
FIG. 17 is a flow chart illustrating a master jig image analysis step S400 of FIG. 16.

FIG. 17 is a flow chart illustrating the master jig image analysis step S400 of FIG. 16.

The master jig image analysis step S400 may comprise a first marking member analysis step S410. In the step S410, the controller 40 may analyze an image of the shape marking member 200 among the images of the master jig 10. In the step S410, the controller 40 may analyze the image of the shape marking member 200 to analyze an alignment state or a misalignment state of cameras of the optical system 30.

The master jig image analysis step S400 may comprise a second marking member analysis step S420. In the step S420, the controller 40 may analyze an image of the brightness marking member 300 among the images of the master jig 10. In the step S420, the controller 40 may analyze the image of the brightness marking member 300 to analyze an alignment state, a misalignment state, or a brightness state of lightings of the optical system 30.

The master jig image analysis step S400 may comprise a third marking member analysis step S430. In the step S430, the controller 40 may analyze an image of the line marking member 400 among the images of the master jig 10. In the step S430, the controller 40 may analyze the image of the line marking member 400 to analyze an alignment state or a misalignment state of the cameras of the optical system 30.

Figure 18:
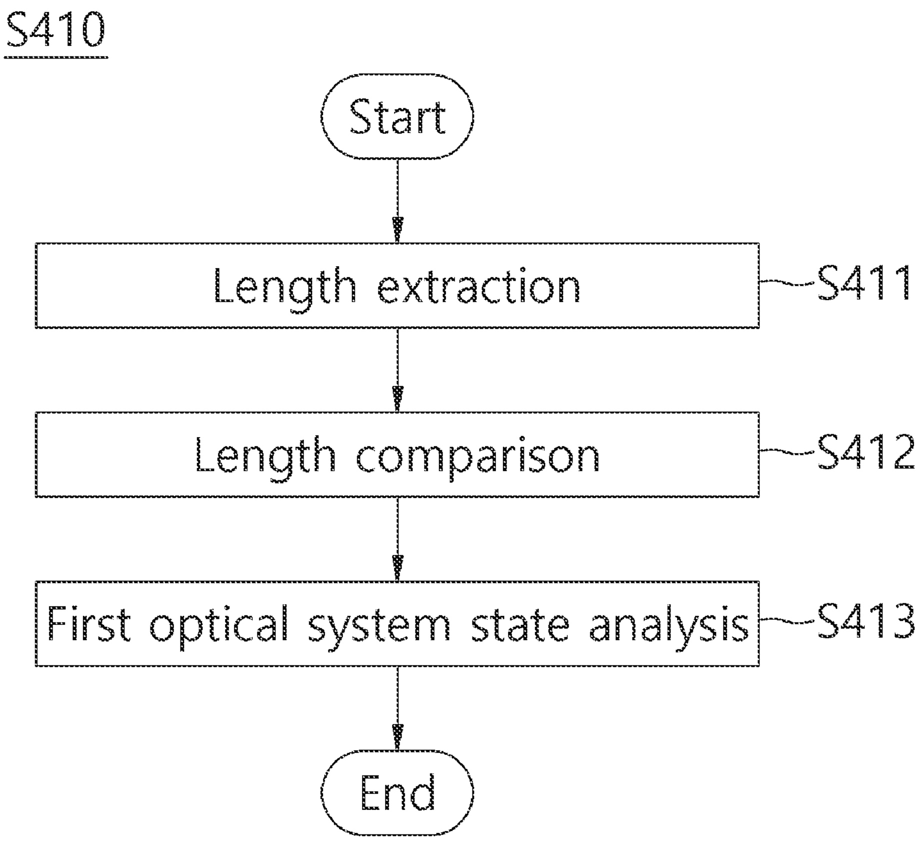
FIG. 18 is a flow chart illustrating a first marking member analysis step S410 of FIG. 17.

FIG. 18 is a flow chart illustrating the first marking member analysis step S410 of FIG. 17.

The first marking member analysis step S410 may comprise a length extraction step S411. In the step S411, the controller 40 may extract a length value of a reference line from the image of the shape marking member 200. In the step S411, the controller 40 may extract the number of pixels of the reference line. The reference line may be a line that can measure a horizontal length or a vertical length of the figure 205.

For example, in the step S411, the controller 40 may extract a length of the 11th reference line L11 or the 12th reference line L12 illustrated in FIG. 6. For example, in the step S411, the controller 40 may extract the number of pixels of the 11th reference line L11 or the 12th reference line L12.

For example, in the step S411, the controller 40 may extract a length of a line connecting the 21st point P21 and the 22nd point P22, a length of a line connecting the 23rd point P23 and the 24th point P24, a length of a line connecting the 21st point P21 and the 23rd point P23, or a length of a line connecting the 22nd point P22 and the 24th point P24 illustrated in FIG. 7. For example, in the step S411, the controller 40 may extract the number of pixels between the 21st point P21 and the 22nd point P22, the number of pixels between the 23rd point P23 and the 24th point P24, the number of pixels between the 21st point P21 and the 23rd point P23, or the number of pixels between the 22nd point P22 and the 24th point P24.

The first marking member analysis step S410 may comprise a length comparison step S412. In the step S412, the controller 40 may compare the length or the number of pixels extracted in the previous step S411 with a preset value.

For example, a preset length may be 2 mm. For example, when a pixel resolution of the optical system 30 is 40 μm to 45 μm, the preset number of pixels corresponding to 2 mm may be 44 to 46.

For example, in the length extraction step S411, the number of pixels may be extracted from the third shape marking member 213, the fourth shape marking member 214, and the sixth shape marking member 231 illustrated in FIG. 2. In this instance, the number of pixels may be the number of pixels extracted from the 11th reference line L11 or the 12th reference line L12 of the shape marking member 200.

For example, the third shape marking member 213 and the fourth shape marking member 214 may be disposed on the outside in the image of the master jig 10 compared to the sixth shape marking member 231. For example, the sixth shape marking member 231 may be disposed at the center in the image of the master jig 10 compared to the third shape marking member 213 and the fourth shape marking member 214.

TABLE 1

| | Measurement position | | |
|---|---|---|---|
| Reference size | 213, L11 Length (Pixel) | 214, L11 Length (Pixel) | 231, L11 Length (Pixel) |
| Reference value | 45 | 45 | 45 |
| Margin of error | ±1.0 | ±1.0 | ±1.0 |
| Minimum allowable value | 44 | 44 | 44 |
| Maximum allowable value | 46 | 46 | 46 |
| Measurement value | 45.25 | 44.75 | 44.33 |

TABLE 2

| Reference size | Measurement position | | |
|---|---|---|---|
| | 213, L12 Length (Pixel) | 214, L12 Length (Pixel) | 231, L12 Length (Pixel) |
| Reference value | 45 | 45 | 45 |
| Margin of error | ±1.0 | ±1.0 | ±1.0 |
| Minimum allowable value | 44 | 44 | 44 |
| Maximum allowable value | 46 | 46 | 46 |
| Measurement value | 45.60 | 45.00 | 45.33 |

Table 1 shows the number of pixels extracted from the 11th reference line L11 of each of the third shape marking member 213, the fourth shape marking member 214, and the sixth shape marking member 231. Table 2 shows the number of pixels extracted from the 12th reference line L12 of each of the third shape marking member 213, the fourth shape marking member 214, and the sixth shape marking member 231.

In Tables 1 and 2, a measurement position may be written in order of the reference numerals of the shape marking member 200 and in order of the reference numerals of the reference line. For example, if the 11th reference line L11 of the third shape marking member 213 is measured, it may be written as '213, L11'.

In Tables 1 and 2, a range between a minimum allowable value and a maximum allowable value may indicate a preset range. For example, a range between 44 pixels and 46 pixels may be the preset range.

In Tables 1 and 2, a measurement value may be the number of pixels extracted from the reference line. For example, the measurement value may be the number of pixels extracted from the 11th reference line L11 or the 12th reference line L12.

The first marking member analysis step S410 may comprise a first optical system state analysis step S413. The first optical system state analysis step S413 may be a step of analyzing the alignment state or the misalignment state of the cameras of the optical system 30 based on the image of the shape marking member 200.

For example, in the step S413, as shown in Tables 1 and 2, if the measurement value falls within the preset range, the optical system 30 may be determined to be in a normal state.

For example, in the step S413, unlike Table 1 or Table 2, if the number of pixels extracted from the third shape marking member 213 or the fourth shape marking member 214 is out of the preset range and is greater than the maximum allowable value, the optical system 30 may be determined to be in an abnormal state. In this instance, it may be determined that a distortion has occurred on the outside in the image of the master jig 10 due to a bending in the lens of the camera of the optical system 30.

For example, in the step S413, unlike Table 1 or Table 2, if the number of pixels extracted from the sixth shape marking member 231 is out of the preset range and is less than the minimum allowable value, the optical system 30 may be determined to be in the abnormal state. In this instance, it may be determined that a focus of the lens of the camera of the optical system 30 is not aligned at the center.

Figure 19:
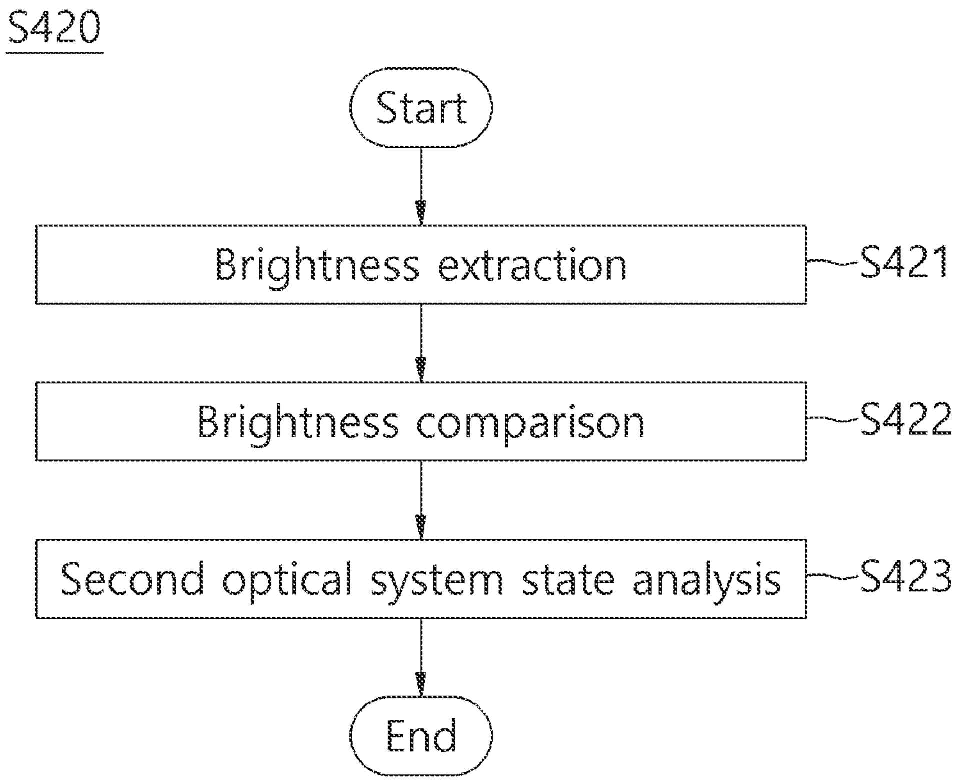
FIG. 19 is a flow chart illustrating a second marking member analysis step S420 of FIG. 17.

FIG. 19 is a flow chart illustrating the second marking member analysis step S420 of FIG. 17.

The second marking member analysis step S420 may comprise a brightness extraction step S421. In the step S421, the controller 40 may extract a brightness value of each brightness area 308 from the image of the brightness marking member 300.

For example, in the step S421, the controller 40 may extract brightness values of the 31st point P31, the 32nd point P32, the 33rd point P33, the 34th point P34, and the 35th point P35 illustrated in FIG. 8. The brightness values extracted from the 31st point P31, the 32nd point P32, the 33rd point P33, the 34th point P34, and the 35th point P35 may refer to brightness values extracted from the respective areas of the brightness marking member 300.

The second marking member analysis step S420 may comprise a brightness comparison step S422. In the step S422, the controller 40 may compare the brightness value extracted in the previous step S421 with a preset value. The preset value may vary depending on a type or brightness of the lighting of the optical system 30.

For example, in the brightness extraction step S421, a brightness value may be extracted from the second brightness marking member 312 illustrated in FIG. 2. In this instance, the brightness value may be a brightness value extracted from each area of the second brightness marking member 312.

TABLE 3

| Reference size | Measurement position | | | | |
|---|---|---|---|---|---|
| | 312, P31 | 312, P32 | 312, P33 | 312, P34 | 312, P35 |
| | Brightness value (Gray Value) | | | | |
| Reference value | 35 | 40 | 50 | 60 | 65 |
| Margin of error | ±3.5 | ±4.0 | ±5.0 | ±6.0 | ±6.5 |
| Minimum allowable value | 31.5 | 36 | 45 | 54 | 58.5 |
| Maximum allowable value | 38.5 | 44 | 55 | 66 | 71.5 |
| Measurement value | 35 | 40 | 49 | 58 | 68 |

TABLE 4

| Reference size | Measurement position | | | | |
|---|---|---|---|---|---|
| | 312, P31 | 312, P32 | 312, P33 | 312, P34 | 312, P35 |
| | Brightness value (Gray Value) | | | | |
| Reference value | 60 | 70 | 85 | 100 | 125 |
| Margin of error | ±6.0 | ±7.0 | ±8.5 | ±10.0 | ±12.5 |
| Minimum allowable value | 54 | 63 | 76.5 | 90 | 112.5 |
| Maximum allowable value | 66 | 77 | 93.5 | 110 | 137.5 |
| Measurement value | 60 | 69 | 85 | 104 | 131 |

TABLE 5

| Reference size | Measurement position | | | | |
|---|---|---|---|---|---|
| | 312, P31 | 312, P32 | 312, P33 | 312, P34 | 312, P35 |
| | Brightness value (Gray Value) | | | | |
| Reference value | 42 | 47 | 57 | 70 | 90 |
| Margin of error | ±4.2 | ±4.7 | ±5.7 | ±7.0 | ±9.0 |
| Minimum allowable value | 37.8 | 42.3 | 51.3 | 63 | 81 |
| Maximum allowable value | 46.2 | 51.7 | 62.7 | 77 | 99 |
| Measurement value | 39 | 45 | 56 | 70 | 92 |

Table 3 shows brightness values extracted from the 31st point P31, the 32nd point P32, the 33rd point P33, the 34th point P34, and the 35th point P35 of the second brightness marking member 312, when the optical system 30 includes a first lighting (not shown). Table 4 shows brightness values extracted from the 31st point P31, the 32nd point P32, the 33rd point P33, the 34th point P34, and the 35th point P35 of the second brightness marking member 312, when the optical system 30 includes a second lighting (not shown). Table 5 shows brightness values extracted from the 31st point P31, the 32nd point P32, the 33rd point P33, the 34th point P34, and the 35th point P35 of the second brightness marking member 312, when the optical system 30 includes a third lighting (not shown).

In Tables 3 to 5, a measurement position may be written in order of the reference numerals of the brightness marking member 300 and in order of the reference numerals of the point. For example, if the 31st point P31 of the second brightness marking member 312 is measured, it may be written as '312, P31'.

In Tables 3 to 5, a range between a minimum allowable value and a maximum allowable value may indicate a preset range. For example, in Table 3, when the reference value is 35, the preset range may be between 31.5 and 38.5.

In Tables 3 to 5, a measurement value may be a value of brightness extracted from the point. For example, the measurement value may be a value of brightness extracted from the 31st point P31.

The second marking member analysis step S420 may comprise a second optical system state analysis step S423. The second optical system state analysis step S423 may be a step of analyzing an alignment state, a misalignment state, or a brightness state of the lightings of the optical system 30 based on the image of the brightness marking member 300.

For example, in the step S423, as shown in Tables 1 to 3, if the measurement value falls within the preset range, the optical system 30 may be determined to be in the normal state.

For example, in the step S423, unlike Tables 1 to 3, if the measurement value is out of the preset range, the optical system 30 may be determined to be in the abnormal state. In this instance, the optical system 30 can be precisely adjusted through the assembly standard of the optical system 30 and a master jig setting program.

Figure 20:
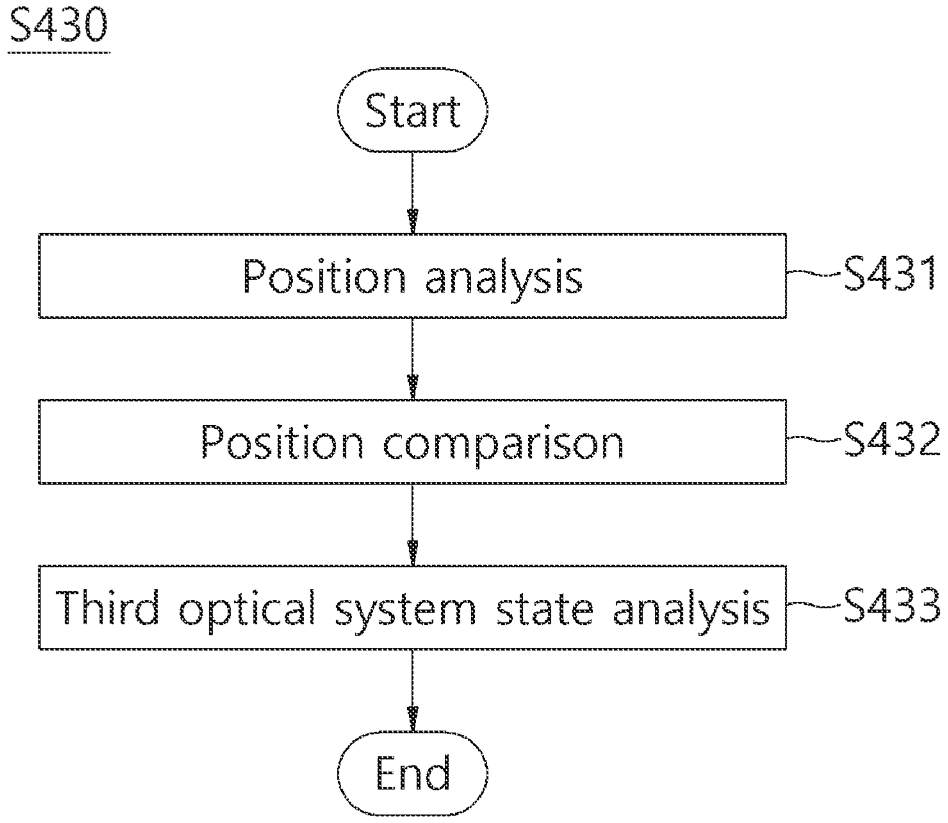
FIG. 20 is a flow chart illustrating a third marking member analysis step S430 of FIG. 17.

FIG. 20 is a flow chart illustrating the third marking member analysis step S430 of FIG. 17.

The third marking member analysis step S430 may comprise a position analysis step S431. In the step S431, the controller 40 may extract a position of the line marking member 400 from the image of the line marking member 400.

For example, in the step S431, the controller 40 may synthesize images taken of the respective zones S1, S2, S3, S4, and S5 illustrated in FIG. 9. For example, the controller 40 may extract the position of the line marking member 400 from the synthesized image.

For example, the controller 40 may extract positions of the first upper side UL1, the second upper side UL2, the third upper side UL3, the fourth upper side UL4, and the fifth upper side UL5 from the synthesized image. For example, the controller 40 may extract positions of the first lower side LL1, the second lower side LL2, the third lower side LL3, the fourth lower side LL4, and the fifth lower side LL5 from the synthesized image.

The third marking member analysis step S430 may comprise a position comparison step S432. In the step S432, the controller 40 may compare the respective position values extracted in the previous step S431 with each other. In the step S432, the controller 40 may analyze the position values extracted in the previous step S431. In the step S432, the controller 40 may determine whether the image of the line marking member 400 is out of boundary lines between the respective zones S1, S2, S3, S4, and S5.

For example, in the step S432, the controller 40 may compare positions of adjacent upper sides. For example, in the step S432, the controller 40 may compare a position of a right end of the first upper side UL1 with a position of a left end of the second upper side UL2.

For example, in the step S432, the controller 40 may compare positions of adjacent lower sides. For example, in the step S432, the controller 40 may compare a position of a right end of the first lower side LL1 with a position of a left end of the second lower side LL2.

The third marking member analysis step S430 may comprise a third optical system state analysis step S433. The third optical system state analysis step S433 may be a step of analyzing an alignment state or a misalignment state of scanners of the optical system 30 based on the image of the line marking member 400.

For example, in the step S433, if positions of ends of adjacent upper sides are the same, the optical system 30 may be determined to be in the normal state. For example, in the step S433, if positions of ends of adjacent lower sides are the same, the optical system 30 may be determined to be in the normal state.

For example, in the step S433, if positions of ends of adjacent upper sides are not the same, the optical system 30 may be determined to be in the abnormal state. For example, in the step S433, if a position of a right end of the first upper side UL1 is not the same as a position of a left end of the second upper side UL2, the optical system 30 may be determined to be in the abnormal state.

For example, in the step S433, if positions of ends of adjacent lower sides are not the same, the optical system 30 may be determined to be in the abnormal state. For example, in the step S433, if a position of a right end of the first lower side LL1 is not the same as a position of a left end of the second lower side LL2, the optical system 30 may be determined to be in the abnormal state.

Based on the equipment diagnosis method S10, states of the plurality of optical systems 30 can be diagnosed at one time while the master jig 10 is transferred along the transfer device 20.

Only specific examples of implementations of certain embodiments are described. Variations, improvements and enhancements of the disclosed embodiments and other embodiments may be made based on the disclosure of this patent document.

What is claimed is:

1. A master jig comprising:

a case; and a marking member coupled to an outer surface of the case, wherein the case includes:

a cell body configured to extend in a left-right direction; and an extension configured to extend from each of left and right sides of the cell body, wherein the marking member includes a plurality of figures consecutively arranged or a plurality of brightness areas arranged along one direction, wherein the plurality of brightness areas is arranged so that a brightness value sequentially increases along the one direction.

2. The master jig of claim 1, wherein the cell body includes:

a cell body upper surface configured to extend in the left-right direction and a front-rear direction;

a cell body inclined surface configured to extend from each of left and right sides of the cell body upper surface and form an angle with respect to the cell body upper surface, the cell body inclined surface being inclined downward as it goes away from the cell body upper surface; and a cell body side surface configured to extend downward from each of a front end and a rear end of the cell body upper surface.

3. The master jig of claim 2, wherein the marking member is coupled to the cell body upper surface, the cell body inclined surface, the cell body side surface, or an upper surface of the extension.

4. The master jig of claim 1, wherein the marking member further includes a first marking member including the plurality of figures, wherein the plurality of figures include:

a first figure type, or a second figure type with a brightness lower than a brightness of the first figure type, wherein at least one first figure corresponding to the first figure type among the plurality of figures and at least one second figure corresponding to the second figure type among the plurality of figures are alternately arranged.

5. The master jig of claim 1, wherein the marking member is configured such that unit figures of first and second figure types with different brightnesses are arranged in a checkerboard shape.

6. The master jig of claim 1, wherein the marking member further includes a second marking member including the plurality of brightness areas, and wherein the plurality of brightness areas each have a different brightness value.

7. The master jig of claim 6, wherein the second marking member extends in the left-right direction or a front-rear direction.

8. The master jig of claim 6, wherein the second marking member includes a plurality of groups including the plurality of brightness areas, and wherein the plurality of groups are disposed to be spaced apart from each other.

9. The master jig of claim 1, wherein the marking member further includes a third marking member including the plurality of figures consecutively arranged, wherein the plurality of figures include:

a first figure; and a second figure with a brightness lower than a brightness of the first figure, wherein the first figure and the second figure are alternately arranged, and wherein a left-right direction length of the third marking member is greater than a front-rear direction length of the third marking member.

10. An equipment diagnosis method comprising:

a master jig insertion step of inserting a master jig into a transfer device;

a master jig movement step of moving the master jig in one direction by the transfer device;

a master jig image acquisition step in which an optical system photographs an outer surface of the master jig to acquire an image of the master jig; and a master jig image analysis step in which a controller analyzes the image of the master jig to diagnose a state of the optical system, wherein the master jig image analysis step comprises a second marking member analysis step of extracting a brightness value from an image of a brightness marking member coupled to the outer surface of the master jig, and wherein the brightness marking member includes a plurality of areas that have different brightness values and have a sequentially increasing brightness value as the plurality of areas go in the one direction.

11. The equipment diagnosis method of claim 10, further comprising:

an analysis result notification step in which a notification unit notifies a user of an alignment state of the optical system.

12. The equipment diagnosis method of claim 10, wherein the master jig image analysis step comprises a first marking member analysis step of extracting a length value of a reference line from an image of a shape marking member coupled to the outer surface of the master jig and comparing the length value with a preset length value.

13. The equipment diagnosis method of claim 12, wherein the length value is a number of pixels included in the image.

14. The equipment diagnosis method of claim 12, wherein the shape marking member includes a plurality of figures, wherein the plurality of figures includes a first figure and a second figure that have different brightnesses and are alternately arranged, and wherein the reference line is a line that is able to measure a horizontal length or a vertical length of the figure.

15. The equipment diagnosis method of claim 12, wherein the shape marking member includes a plurality of shape marking members and is coupled to several portions of the outer surface of the master jig, and wherein the first marking member analysis step comprises comparing a length value of the reference line extracted from each of the plurality of shape marking members with the preset length value.

16. The equipment diagnosis method of claim 10, wherein the second marking member analysis step compares the brightness value of the plurality of areas with a preset brightness value.

17. The equipment diagnosis method of claim 10, wherein the master jig includes a line marking member coupled to the outer surface of the master jig, wherein the master jig image acquisition step comprises a step in which the optical system divides the line marking member into a plurality of zones and photographs the plurality of zones, and wherein the plurality of zones are consecutively arranged along the one direction.

18. The equipment diagnosis method of claim 17, wherein the master jig image analysis step comprises a third marking member analysis step of synthesizing images of the plurality of zones and determining whether there is a misaligned portion in a boundary line between the respective zones in the synthesized image based on an image of the line marking member.

* * * * *